(12) United States Patent
Liu et al.

(10) Patent No.: US 8,947,677 B2
(45) Date of Patent: Feb. 3, 2015

(54) DUAL-FREQUENCY PHASE MULTIPLEXING (DFPM) AND PERIOD CODED PHASE MEASURING (PCPM) PATTERN STRATEGIES IN 3-D STRUCTURED LIGHT SYSTEMS, AND LOOKUP TABLE (LUT) BASED DATA PROCESSING

(75) Inventors: Kai Liu, Wuxi (CN); Yongchang Wang, Milpitas, CA (US); Daniel L. Lau, Lexington, KY (US); Laurence G. Hassebrook, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 239 days.

(21) Appl. No.: 13/205,607

(22) Filed: Aug. 8, 2011

(65) Prior Publication Data

US 2012/0092463 A1  Apr. 19, 2012

Related U.S. Application Data

(60) Provisional application No. 61/371,626, filed on Aug. 6, 2010.

(51) Int. Cl.
*G01B 11/24* (2006.01)
*G01B 11/25* (2006.01)
*G06T 7/00* (2006.01)

(52) U.S. Cl.
CPC .......... *G01B 11/2536* (2013.01); *G06T 7/0057* (2013.01)
USPC .......................................... 356/603; 356/602

(58) Field of Classification Search
USPC ................. 356/601–608, 610–611, 616–618; 348/50, E13.074, 46
See application file for complete search history.

(56) References Cited

U.S. PATENT DOCUMENTS 5,633,755 A   5/1997 Manabe et al.
6,788,210 B1  9/2004 Huang et al.
(Continued)

OTHER PUBLICATIONS

Frisken, S. F., R. N. Perry, A. P. Rockwood, and T. R. Jones, "Adaptively sampled distance fields: A general representation of shape for computer graphics," in Proceedings of the 27th annual conference on Computer graphics and interactive techniques, 249-254 (2000).

(Continued)

*Primary Examiner* — Tri T Ton
(74) *Attorney, Agent, or Firm* — Macheledt Bales LLP

(57) ABSTRACT

A computer-implemented process, system, and computer-readable storage medium having stored thereon, program code and instructions for 3-D triangulation-based image acquisition of a contoured surface/object-of-interest under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

where $I_n^p$ is the intensity of a pixel in the projector for $n^{th}$ projected image in a particular instant in time; K is an integer representing the number of component sinusoids (e.g., K=2 for a dual-frequency sinusoid pattern, K=3 for a triple-frequency sinusoid, each component sinusoid having a distinct temporal frequency, where K is $\leq(N+1)/2$.

12 Claims, 14 Drawing Sheets

(56) References Cited

U.S. PATENT DOCUMENTS

| | | |
|---|---|---|
| 6,874,894 B2 | 4/2005 | Kitamura |
| 6,977,732 B2 | 12/2005 | Chen et al. |
| 7,440,590 B1 | 10/2008 | Hassebrook et al. |
| 7,844,079 B2 | 11/2010 | Hassebrook et al. |
| 8,224,068 B2 | 7/2012 | Hassebrook et al. |
| 2008/0279446 A1* | 11/2008 | Hassebrook et al. ......... 382/154 |
| 2012/0113229 A1* | 5/2012 | Hassebrook et al. ........... 348/47 |
| 2012/0120412 A1* | 5/2012 | Bellis et al. ................... 356/603 |
| 2012/0120413 A1* | 5/2012 | Bellis et al. ................... 356/603 |

OTHER PUBLICATIONS

Li, Jielin, Hassebrook, L. G., and Guan. C., "Optimized two-frequency phase-measuringprofilometry light-sensor temporal-noise sensitivity," J. Opt. Soc Am. A. vol. 20, No. 1, pp. 106-115 (Jan. 2003).

* cited by examiner

Pinhole lens model

PRIOR ART
FIG. 4
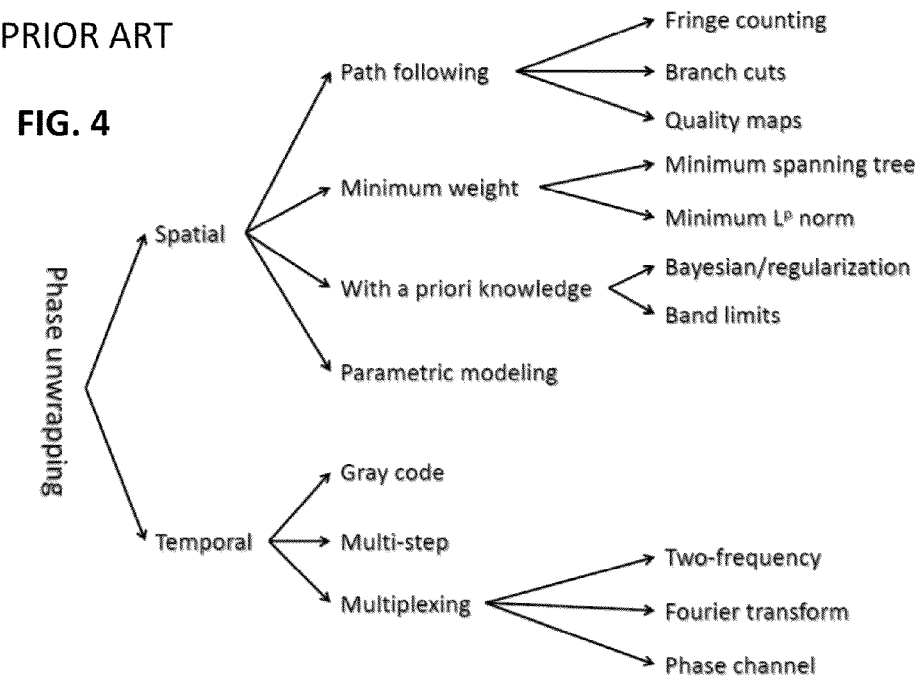
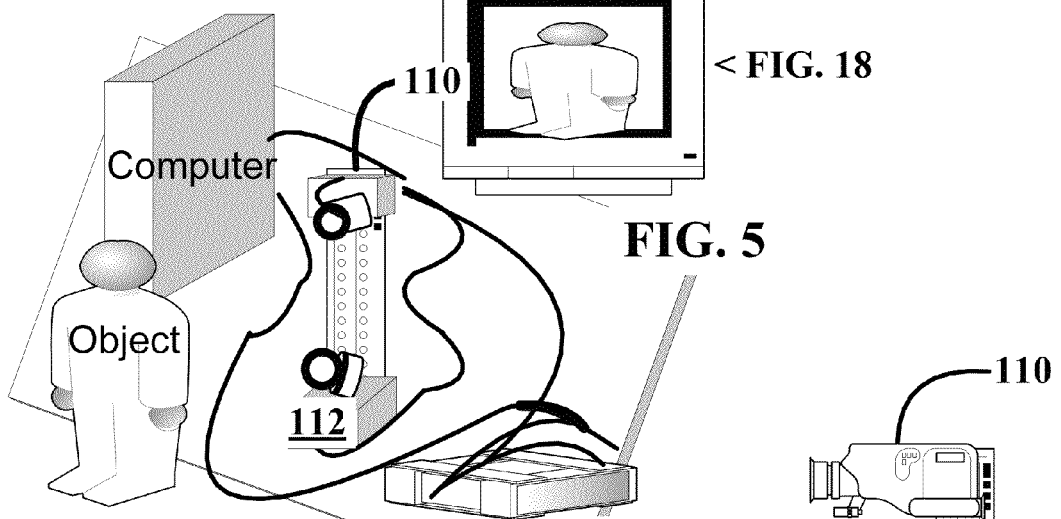
FIG. 5
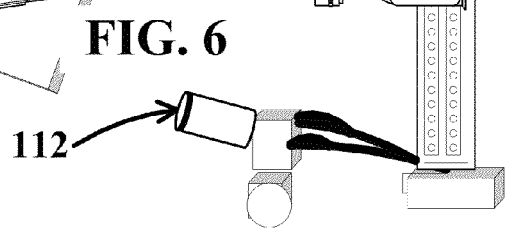
FIG. 6

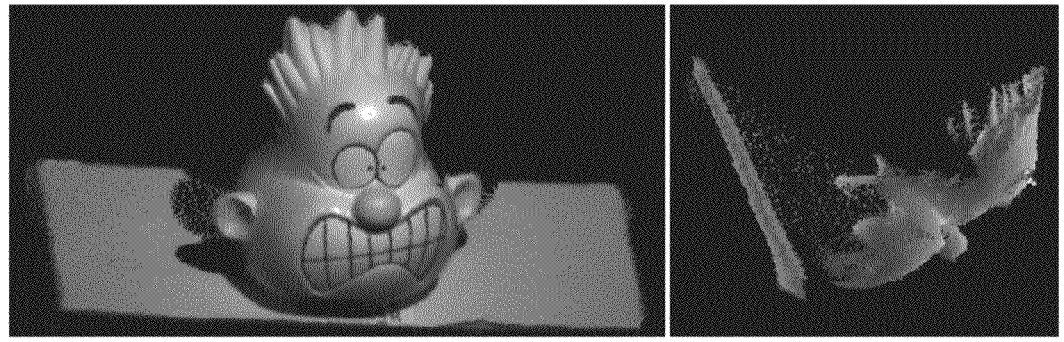
FIG. 12(A)  FIG. 12(B)
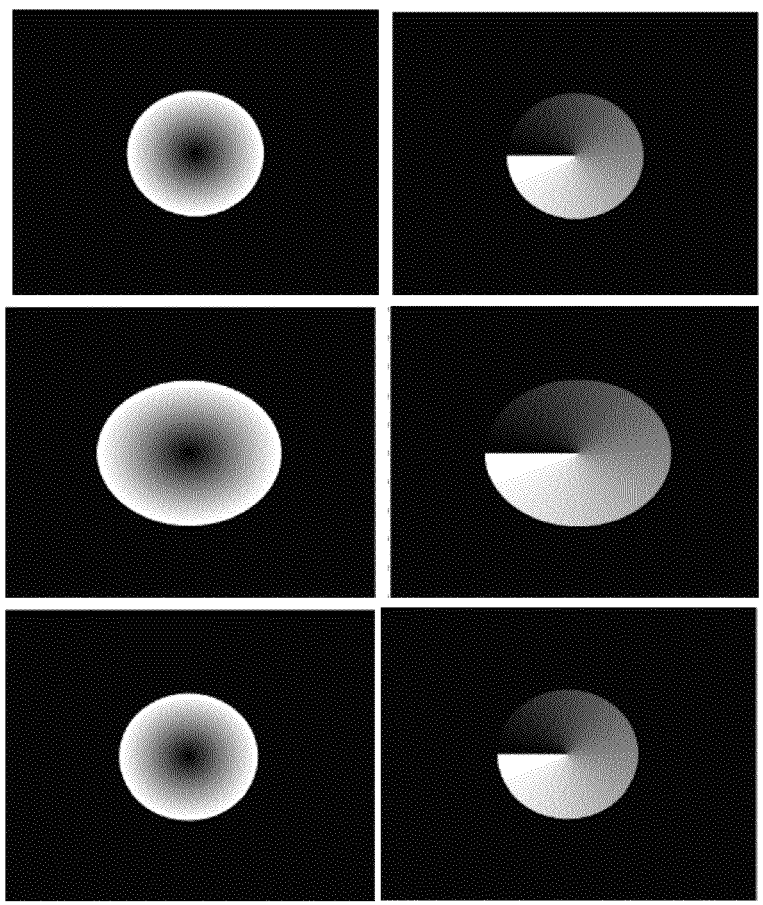
FIG. 13

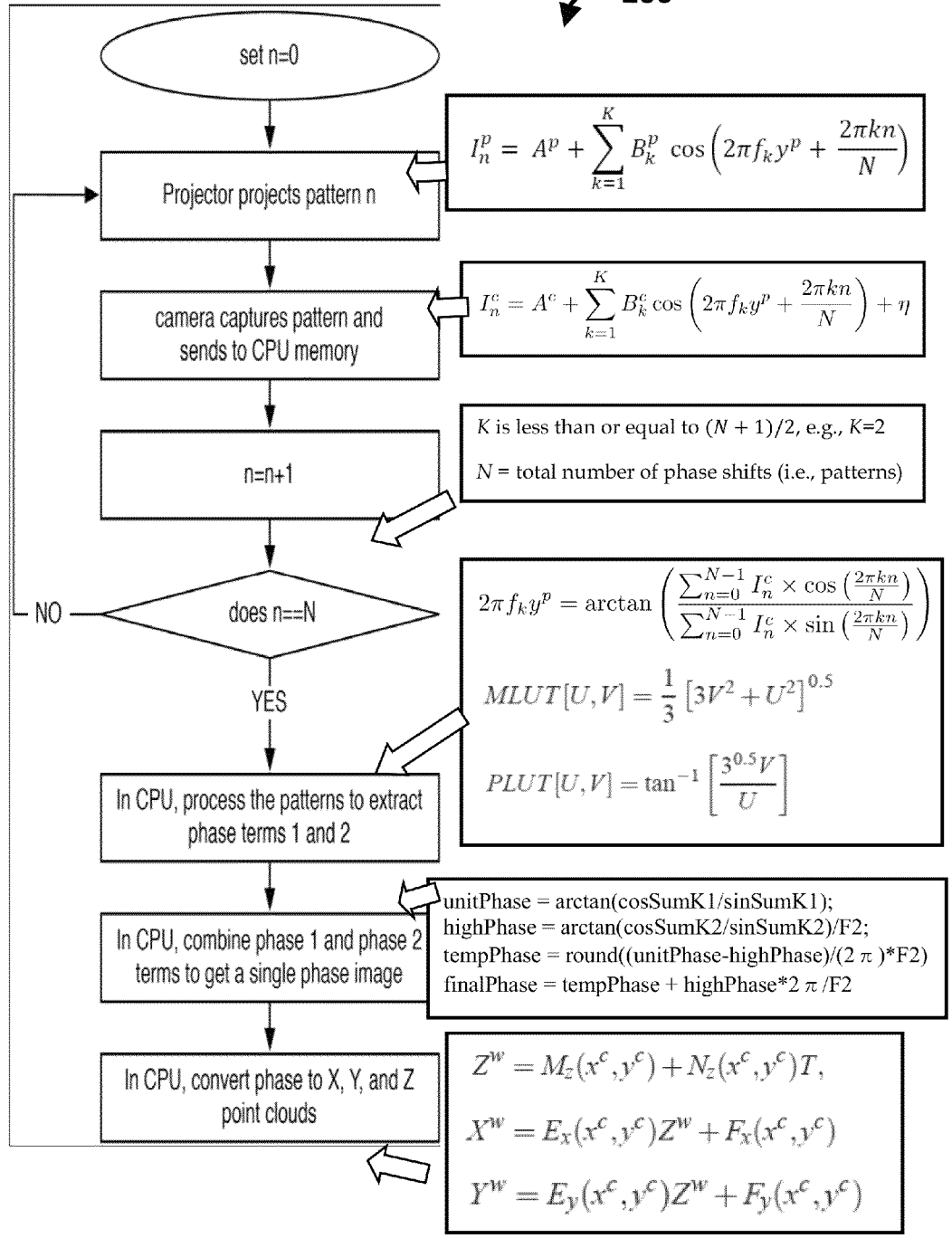

FIG. 20

$$M_x(x^c, y^c) = \frac{\left(\frac{a_{x_1}x^c + a_{x_2}y^c + a_{x_3}}{d_1 x^c + d_2 y^c + d_3}\right)}{\left(\frac{c_1 x^c + c_2 y^c + c_3}{d_1 x^c + d_2 y^c + d_3}\right)}, \quad N_x(x^c, y^c) = \frac{b_{x_1}x^c + b_{x_2}y^c + b_{x_3}}{d_1 x^c + d_2 y^c + d_3} - M_x(x^c, y^c),$$

$$M_y(x^c, y^c) = \frac{\left(\frac{a_{y_1}x^c + a_{y_2}y^c + a_{y_3}}{d_1 x^c + d_2 y^c + d_3}\right)}{\left(\frac{c_1 x^c + c_2 y^c + c_3}{d_1 x^c + d_2 y^c + d_3}\right)}, \quad N_y(x^c, y^c) = \frac{b_{y_1}x^c + b_{y_2}y^c + b_{y_3}}{d_1 x^c + d_2 y^c + d_3} - M_y(x^c, y^c),$$

$$M_z(x^c, y^c) = \frac{\left(\frac{a_{z_1}x^c + a_{z_2}y^c + a_{z_3}}{d_1 x^c + d_2 y^c + d_3}\right)}{\left(\frac{c_1 x^c + c_2 y^c + c_3}{d_1 x^c + d_2 y^c + d_3}\right)}, \quad N_z(x^c, y^c) = \frac{b_{z_1}x^c + b_{z_2}y^c + b_{z_3}}{d_1 x^c + d_2 y^c + d_3} - M_z(x^c, y^c),$$

$$a_{x_1} = m^c_{22}m^p_{34}m^p_{33} + m^c_{23}m^c_{32}m^p_{34} + m^c_{24}m^c_{33}m^p_{32} - m^c_{22}m^c_{33}m^p_{34} - m^c_{23}m^c_{34}m^p_{32} - m^c_{24}m^c_{32}m^p_{33},$$
$$a_{x_2} = m^c_{12}m^c_{33}m^p_{34} + m^c_{13}m^c_{34}m^p_{32} + m^c_{14}m^c_{32}m^p_{33} - m^c_{12}m^c_{34}m^p_{33} - m^c_{13}m^c_{32}m^p_{34} - m^c_{14}m^c_{33}m^p_{32},$$
$$a_{x_3} = m^c_{12}m^c_{24}m^p_{33} + m^c_{13}m^c_{22}m^p_{34} + m^c_{14}m^c_{23}m^p_{32} - m^c_{12}m^c_{23}m^p_{34} - m^c_{13}m^c_{24}m^p_{32} - m^c_{14}m^c_{22}m^p_{33},$$
$$a_{y_1} = m^c_{21}m^c_{33}m^p_{34} + m^c_{23}m^c_{34}m^p_{31} + m^c_{24}m^c_{31}m^p_{33} - m^c_{21}m^c_{34}m^p_{33} - m^c_{23}m^c_{31}m^p_{34} - m^c_{24}m^c_{33}m^p_{31},$$
$$a_{y_2} = m^c_{11}m^c_{34}m^p_{33} + m^c_{13}m^c_{31}m^p_{34} + m^c_{14}m^c_{33}m^p_{31} - m^c_{11}m^c_{33}m^p_{34} - m^c_{13}m^c_{34}m^p_{31} - m^c_{14}m^c_{31}m^p_{33},$$
$$a_{y_3} = m^c_{11}m^c_{23}m^p_{34} + m^c_{13}m^c_{24}m^p_{31} + m^c_{14}m^c_{21}m^p_{33} - m^c_{11}m^c_{24}m^p_{33} - m^c_{13}m^c_{21}m^p_{34} - m^c_{14}m^c_{23}m^p_{31},$$
$$a_{z_1} = m^c_{21}m^c_{34}m^p_{32} + m^c_{22}m^c_{31}m^p_{34} + m^c_{24}m^c_{32}m^p_{31} - m^c_{21}m^c_{32}m^p_{34} - m^c_{22}m^c_{34}m^p_{31} - m^c_{24}m^c_{31}m^p_{32},$$
$$a_{z_2} = m^c_{11}m^c_{32}m^p_{34} + m^c_{12}m^c_{34}m^p_{31} + m^c_{14}m^c_{31}m^p_{32} - m^c_{11}m^c_{34}m^p_{32} - m^c_{12}m^c_{31}m^p_{34} - m^c_{14}m^c_{32}m^p_{31},$$
$$a_{z_3} = m^c_{11}m^c_{24}m^p_{32} + m^c_{12}m^c_{21}m^p_{34} + m^c_{14}m^c_{22}m^p_{31} - m^c_{11}m^c_{22}m^p_{34} - m^c_{12}m^c_{24}m^p_{31} - m^c_{14}m^c_{21}m^p_{32},$$
$$b_{x_1} = m^c_{22}m^c_{33}m^p_{24} + m^c_{23}m^c_{34}m^p_{22} + m^c_{24}m^c_{32}m^p_{23} - m^c_{22}m^c_{34}m^p_{23} - m^c_{23}m^c_{32}m^p_{24} - m^c_{24}m^c_{33}m^p_{22},$$
$$b_{x_2} = m^c_{12}m^c_{34}m^p_{23} + m^c_{13}m^c_{32}m^p_{24} + m^c_{14}m^c_{33}m^p_{22} - m^c_{12}m^c_{33}m^p_{24} - m^c_{13}m^c_{34}m^p_{22} - m^c_{14}m^c_{32}m^p_{23},$$
$$b_{x_3} = m^c_{12}m^c_{23}m^p_{24} + m^c_{13}m^c_{24}m^p_{22} + m^c_{14}m^c_{22}m^p_{23} - m^c_{12}m^c_{24}m^p_{23} - m^c_{13}m^c_{22}m^p_{24} - m^c_{14}m^c_{23}m^p_{22},$$
$$b_{y_1} = m^c_{21}m^c_{34}m^p_{23} + m^c_{23}m^c_{31}m^p_{24} + m^c_{24}m^c_{33}m^p_{21} - m^c_{21}m^c_{33}m^p_{24} - m^c_{23}m^c_{34}m^p_{21} - m^c_{24}m^c_{31}m^p_{23},$$
$$b_{y_2} = m^c_{11}m^c_{33}m^p_{24} + m^c_{13}m^c_{34}m^p_{21} + m^c_{14}m^c_{31}m^p_{23} - m^c_{11}m^c_{34}m^p_{23} - m^c_{13}m^c_{31}m^p_{24} - m^c_{14}m^c_{33}m^p_{21},$$
$$b_{y_3} = m^c_{11}m^c_{24}m^p_{23} + m^c_{13}m^c_{21}m^p_{24} + m^c_{14}m^c_{23}m^p_{21} - m^c_{11}m^c_{23}m^p_{24} - m^c_{13}m^c_{24}m^p_{21} - m^c_{14}m^c_{21}m^p_{23},$$
$$b_{z_1} = m^c_{21}m^c_{32}m^p_{24} + m^c_{22}m^c_{34}m^p_{21} + m^c_{24}m^c_{31}m^p_{22} - m^c_{21}m^c_{34}m^p_{22} - m^c_{22}m^c_{31}m^p_{24} - m^c_{24}m^c_{32}m^p_{21},$$
$$b_{z_2} = m^c_{11}m^c_{34}m^p_{22} + m^c_{12}m^c_{31}m^p_{24} + m^c_{14}m^c_{32}m^p_{21} - m^c_{11}m^c_{32}m^p_{24} - m^c_{12}m^c_{34}m^p_{21} - m^c_{14}m^c_{31}m^p_{22},$$
$$b_{z_3} = m^c_{11}m^c_{22}m^p_{24} + m^c_{12}m^c_{24}m^p_{21} + m^c_{14}m^c_{21}m^p_{22} - m^c_{11}m^c_{24}m^p_{22} - m^c_{12}m^c_{21}m^p_{24} - m^c_{14}m^c_{22}m^p_{21},$$
$$c_1 = m^c_{21}m^c_{32}m^p_{33} + m^c_{22}m^c_{33}m^p_{31} + m^c_{23}m^c_{31}m^p_{32} - m^c_{21}m^c_{33}m^p_{32} - m^c_{22}m^c_{31}m^p_{33} - m^c_{23}m^c_{32}m^p_{31},$$
$$c_2 = m^c_{11}m^c_{33}m^p_{32} + m^c_{12}m^c_{31}m^p_{33} + m^c_{13}m^c_{32}m^p_{31} - m^c_{11}m^c_{32}m^p_{33} - m^c_{12}m^c_{33}m^p_{31} - m^c_{13}m^c_{31}m^p_{32},$$
$$c_3 = m^c_{11}m^c_{22}m^p_{33} + m^c_{12}m^c_{23}m^p_{31} + m^c_{13}m^c_{21}m^p_{32} - m^c_{11}m^c_{23}m^p_{32} - m^c_{12}m^c_{21}m^p_{33} - m^c_{13}m^c_{22}m^p_{31},$$
$$d_1 = m^c_{21}m^c_{33}m^p_{22} + m^c_{22}m^c_{31}m^p_{23} + m^c_{23}m^c_{32}m^p_{21} - m^c_{21}m^c_{32}m^p_{23} - m^c_{22}m^c_{33}m^p_{21} - m^c_{23}m^c_{31}m^p_{22},$$
$$d_2 = m^c_{11}m^c_{32}m^p_{23} + m^c_{12}m^c_{33}m^p_{21} + m^c_{13}m^c_{31}m^p_{22} - m^c_{11}m^c_{33}m^p_{22} - m^c_{12}m^c_{31}m^p_{23} - m^c_{13}m^c_{32}m^p_{21},$$
$$d_3 = m^c_{11}m^c_{23}m^p_{22} + m^c_{12}m^c_{21}m^p_{23} + m^c_{13}m^c_{22}m^p_{21} - m^c_{11}m^c_{22}m^p_{23} - m^c_{12}m^c_{23}m^p_{21} - m^c_{13}m^c_{21}m^p_{22}.$$

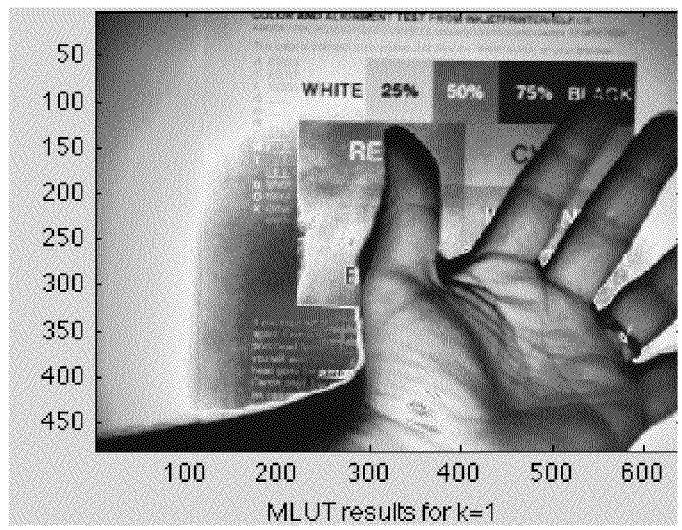
FIG. 21(A)
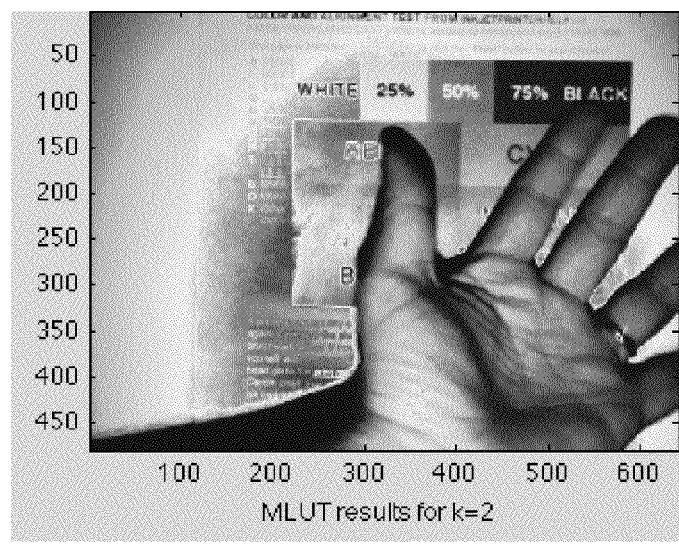
FIG. 21(B)
FIG. 21(C)
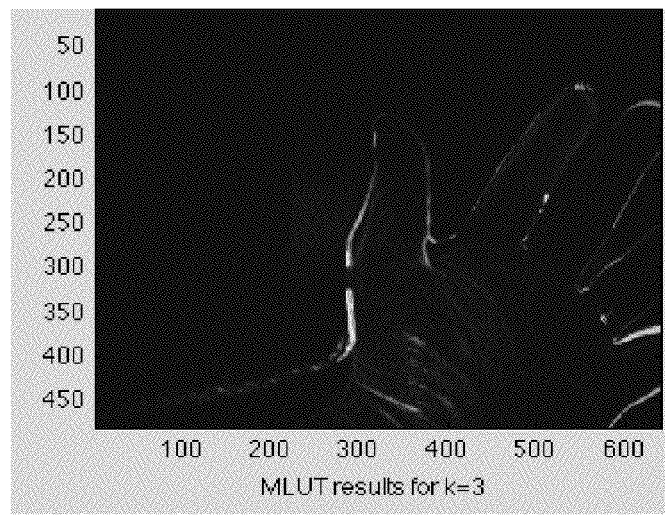

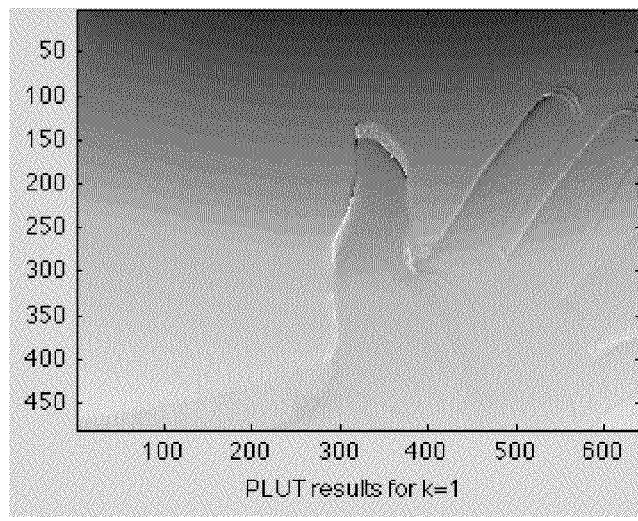
FIG. 21(D)
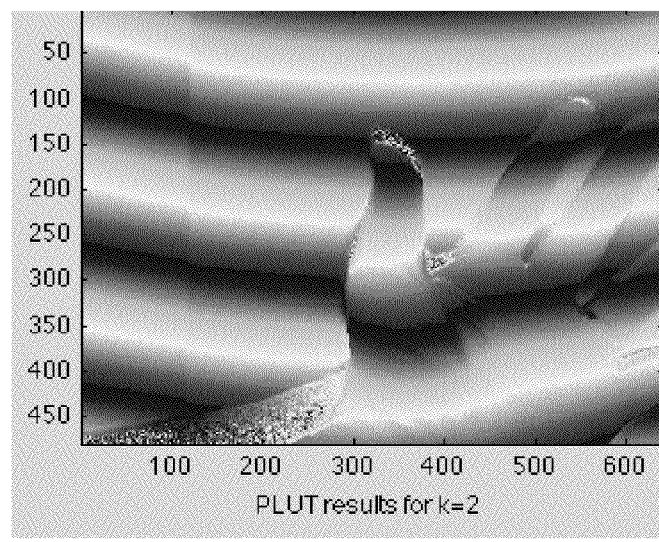
FIG. 21(E)
FIG. 21(F)
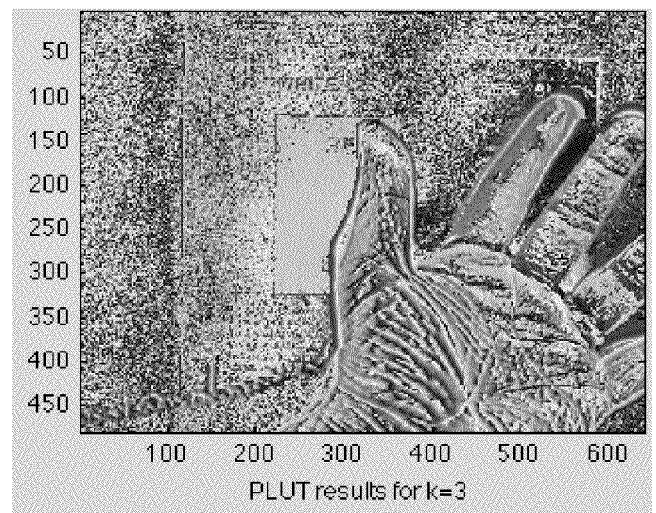

DUAL-FREQUENCY PHASE MULTIPLEXING (DFPM) AND PERIOD CODED PHASE MEASURING (PCPM) PATTERN STRATEGIES IN 3-D STRUCTURED LIGHT SYSTEMS, AND LOOKUP TABLE (LUT) BASED DATA PROCESSING

PRIORITY BENEFIT TO CO-PENDING PATENT APPLICATIONS

This application claims benefit of U.S. Provisional Patent Application No. 61/371,626 filed 6 Aug. 2010 describing developments of the applicants hereof, on behalf of the assignee. The specification, drawings, and technical materials of U.S. Prov. Pat. App. No. 61/371,626 are hereby incorporated herein by reference, in their entirety, to the extent it is consistent with, and provides further edification of the advancements set forth in, the instant application.

STATEMENT OF GOVERNMENT AWARD

The invention disclosed in this U.S. patent application was made, in part, with United States government support awarded by the following agencies: Department of Justice/National Institute of Justice, Grant No. 304688600. Accordingly, the U.S. Government has rights in this invention.

BACKGROUND OF THE INVENTION

Field of the Invention

In general, the present invention relates to computer implemented triangulation-based three-dimensional ("3-D" or "3D") digital image reconstruction techniques—such as structured light illumination (SLI) systems, stereo vision, time-of-flight depth sensing, and so on—used in performing 3D image acquisition to digitize an artifact feature or contoured surface/subject of interest.

More-particularly, the invention is directed to a unique computer-implemented process, system, and computer-readable storage medium having stored thereon, executable program code and instructions for 3-D triangulation-based image acquisition of a contoured surface-of-interest (or simply, "contour" or "contour-of-interest") under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

where $I_n^p$ is the intensity of a pixel in the projector for the $n^{th}$ projected image in a particular instant/moment in time (p, to represent projector); K is an integer representing the number of component sinusoids (e.g., K=2 for a dual-frequency sinusoid pattern, K=3 for a triple-frequency sinusoid, and so on), each component sinusoid having a distinct temporal frequency, where K is less than or equal to (N+1)/2. The parameter $B_k^p$ represents constants that determine the amplitude or signal strength of the component sinusoids; $A^p$ is a scalar constant used to ensure that all values of $I_n^p$ are greater than zero, 0 (that is to say, that the projector unit will not project less than 0 magnitude of light); $f_k$ is the spatial frequency of the $k^{th}$ sinusoid corresponding to temporal frequency k; and $y^p$ represents a spatial coordinate in the projected image. For example, $y^p$ may represent a vertical row coordinate or a horizontal column coordinate of the projected image; n represents phase-shift index or sequence order (e.g., the n=0 pattern is first projected, and then the n=1 pattern, and so on, effectively representing a specific moment in discrete time). N is the total number of phase shifts—i.e., the total number of patterns—that are projected, and for each pattern projected, a corresponding image will be captured by the camera (or rather, the camera's image sensor). When used throughout, the superscript "c" references parameters relating to an image or series of images (video) as captured by the camera, whereas superscript "p" references the projector.

Where pixels are projected to satisfy Eq. 1.1, the pixels of the images then captured by the camera are defined according to the unique technique governed by the expression:

$$I_n^c = A^c + \sum_{k=1}^{K} B_k^c \cos\left(2\pi f_k y^p + \frac{2\pi k n}{N}\right) + \eta \qquad \text{Eq. (1.2)}$$

The term $\eta$ ("eta") represents a noise due to a certain amount of error introduced into the image by the light sensor of the camera. Recall, a camera image is made up of a multitude of pixels, each pixel defined by Eq. 1.2, with values for $A^c$, $B_k^c$, and $\eta^c$ different for each pixel. The "c" superscript indicating a value is dependent on the position of the pixel as referenced in the camera sensor ('camera space'). To obtain phase terms from the pixels projected in accordance with Eq. 1.2, the unique expression, below, is carried-out for each k:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \qquad \text{Eq. (1.3)}$$

where, as before, $y^p$ represents a spatial coordinate in the projected image. In EXAMPLE 01, herein below, where K is set equal to 2, the phase terms for the cases where k=1 and k=2 (i.e., for the two superimposed sinusoids) must be determined. FIGS. 8A, 8B are reproductions of computer-generated/implemented images of patterns projected onto a human hand, by way of example; FIG. 8C is FIG. 8B, enlarged to view representative stripes numbered from the top 1 through 10, by way of example. FIG. 8A is an image representing phase for the k=1 term where f=1 (unit-frequency). FIGS. 8B, 8C are reproductions of an image representing the phase term for k=2 where f=20 (i.e., the high-frequency sinusoid). Note that the stripped pattern in FIG. 8B/C has 20 stripes.

When applying the use of temporal unwrapping techniques, for the case where k=2 using Eq. 1.1, one can determine that the projected pixels will satisfy $$I_n^p = A^p + B_2^p \cos\left(2\pi f_2 y^p + \frac{2\pi 2 n}{N}\right), \qquad \text{Eq. (1.1)}$$

$$k = 2$$

Where this leads to 20 stripes (as shown, for example, in FIG. 8B as a pattern projected on a human hand, the enlargement of which is labeled FIG. 8C to better view stripes), one must determine which of the 20 stripes each particular pixel falls in the projected image (e.g., FIG. 8C). Using a traditional phase unwrapping approach to determine where each pixel fell in the projected image would require a mathematical form of 'stripe counting'—which is computationally quite burdensome.

Rather, according to the instant invention, a second set of patterns (k=1) all unit-frequency sinusoids (i.e., f=1) is superimposed with a high-frequency sinusoid, such as one of 20 stripes, k=2 pattern. The unit-frequency signal is defined by an adaptation of Eq. 1.1

$$I_n^p = A^p + B_1^p \cos\left(2\pi f_1 y^p + \frac{2\pi n}{N}\right), \quad k=1 \qquad \text{Eq. (1.1)}$$

Therefore, rather than projecting a total of N patterns onto the contoured surface-of-interest, there are now 2*N patterns projected (such that K=2 and each pixel projected from the projector is comprised of a dual-frequency pattern, one is a unit-frequency sinusoid and the second is a high-frequency sinusoid). However, very unique to the applicants' technique according to the invention, the plurality of pixels projected using Eq. 1.1 are 'instantly decodable' such that the computerized processing unit (CPU) of the computerized device in communication with the projector and camera units, at this point already, has the data and the means to determine (closely enough) which stripe each projected pixel $I_n^p$ is in, while determining $2\pi f_2 y^p$ (i.e., phase) of the camera image (of pixel intensity, $I_n^c$), according to Eq. 1.3—reproduced again, below, for handy reference:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \qquad \text{Eq. (1.3)}$$

To carry-out phase unwrapping of the high-frequency sinusoid the following steps can be taken, whereby the following four variables—unitPhase, highPhase, tempPhase, and finalPhase as labeled as defined, below—are determined:

$$unitPhase = \arctan\left(\frac{\cos\sum K_1}{\sin\sum K_1}\right)$$

$$highPhase = \arctan\left(\frac{\cos\sum K_2}{\sin\sum K_2}\right)/f_2$$

$$tempPhase = \text{round}\left(\frac{(unitPhase - highPhase)}{(2\pi)f_2}\right)$$

$$finalPhase = tempPhase + highPhase*(2\pi/f_2)$$

Or, summarized in pseudo code short-hand notation as done in FIG. 19, the above computational steps—employing the same notation for the parameters immediately above, namely, unitPhase, highPhase, tempPhase, and finalPhase—may be rewritten as:

unitPhase=arctan(cos SumK1/sin SumK1);

highPhase=arctan(cos SumK2/sin SumK2)/F2;

tempPhase=round((unitPhase−highPhase)/(2*PI)*F2);

finalPhase=tempPhase+highPhase*2*PI/F2

The first and second superimposed sinusoid may comprise, for example as noted in EXAMPLE 01, below, a unit-frequency sinusoid (in this context, 'unit' refers to having a magnitude value of 1) superimposed on a high-frequency sinusoid, the unit-frequency sinusoid and high-frequency sinusoid being projected simultaneously (i.e., effectively 'on top of one another' over a selected epoch/duration of frames, n) from a projection unit, or projector, as a plurality of pixels such that each of the pixels projected satisfy the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), $f_h$ is the high frequency of the sine wave, $f_u$ is the 'unit' frequency of the sine wave. The unit-frequency signal/sinusoid is used during a demodulation step to produce a decodable, unwrapped-phase term temporally.

Additionally, the process includes a decoding of the projected patterns by carrying-out a lookup table (LUT)-based processing of video image data acquired by at least one image-capture device. The decoding step is performed to extract, real-time, coordinate information about the surface shape-of-interest. The LUT-based processing includes the step of implementing (or, querying) a pre-computed modulation lookup table (MLUT) to obtain a texture map for the contoured surface-of-interest and implementing (or, querying) a pre-computed phase lookup table (PLUT) to obtain corresponding phase for the video image data acquired of the contoured surface-of-interest. Furthermore, use of conventional digital image point clouds can be made to display, real-time, the data acquired.

In one aspect, the unique computer-implemented process, system, and computer-readable storage medium with executable program code and instructions, can be characterized as having two stages. The first being a dual-frequency pattern generation and projection stage, the dual-frequency pattern characterized by the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$) are constants that are preferably set, by way of example, to make the value of $I_n^p$ fall between 0 and 255 for an 8-bit color depth projector, $f_h$ is the high frequency of the sine wave, $f_u$ is the unit frequency of the sine wave and equals 1, n represents phase-shift index, and N is the total number of phase shifts and is preferably greater than or equal to 5. The second stage comprises a de-codification stage employing a lookup table (LUT) method for phase, intensity/texture, and depth data.

SLI works by measuring the deformation of a light pattern that has been projected on the surface contours of an object; see, FIGS. 1A, 1B. The pattern is used to identify the points in camera coordinates; mathematical operation is performed to find the position of each point in 3-D space. There are a variety of SLI pattern types in use: single dimensioned lines, two dimensioned stripes, grids or dot matrices. For example, unique composite SLI patterns are disclosed in U.S. Pat. No. 7,844,079 B2 granted 30 Nov. 2010 to Hassebrook et al. and U.S. Pat. No. 7,440,590 B1 granted 21 Oct. 2008 to Hassebrook et al., both patents having at least one common inventor with the instant application and commonly-owned with the instant application upon filing, and entitled *"System and Technique for Retrieving Depth Information about a Surface by Projecting a Composite Image of Modulated Light Patterns."*

General Background Discussion of Technology: SLI

SLI measurement is based on the mathematical operation known as triangulation, see FIG. 1A. Results are useful when there is a well defined relationship between a single point on the projection plane of interest and a corresponding point on a captured image. It is to establish this relationship that SLI projection patterns, FIG. 1A, are utilized. An SLI projection pattern—such as those labeled in FIG. 1B at 10(*a*), 10(*b*), 10(*c*))—is preferably designed such that each pixel (or row or column, depending on the specific implementation) of the projection image is uniquely characterized, either by some characteristic intensity value sequence or by some other identifiable property such as a local pattern of shapes or colors. When projected onto a subject-of-interest (i.e., labeled "_object_" in FIG. 5), an image of the pattern illuminating a projection plane of interest captured by a camera is analyzed to locate these identifiable projection pattern points. Given a fixed location for both camera and projector, the location of any given pattern point on the subject creates a unique triangle with dimensions defined by the depth of the subject surface. SLI systems are further classified into single-frame techniques, which require only one image capture to calculate surface characteristics, and multi-frame (or "time multiplexed") techniques, which require multiple projection/capture instances in order to acquire enough information for surface reconstruction.

Background: Computerized Devices, Memory & Storage Devices/Media.

I. Digital Computers.

A processor is the set of logic devices/circuitry that responds to and processes instructions to drive a computerized device. The central processing unit (CPU) is considered the computing part of a digital or other type of computerized system. Often referred to simply as a processor, a CPU is made up of the control unit, program sequencer, and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single 'chip', often referred to as microprocessors because of their tiny physical size. As is well known, the basic elements of a simple computer include a CPU, clock and main memory; whereas a complete computer system requires the addition of control units, input, output and storage devices, as well as an operating system. The tiny devices referred to as 'microprocessors' typically contain the processing components of a CPU as integrated circuitry, along with associated bus interface. A microcontroller typically incorporates one or more microprocessor, memory, and I/O circuits as an integrated circuit (IC). Computer instruction(s) are used to trigger computations carried out by the CPU.

II. Computer Memory and Computer Readable Storage.

While the word 'memory' has historically referred to that which is stored temporarily, with storage traditionally used to refer to a semi-permanent or permanent holding place for digital data—such as that entered by a user for holding long term—more-recently, the definitions of these terms have blurred. A non-exhaustive listing of well known computer readable storage device technologies compatible with a variety of computer processing structures are categorized here for reference: (1) magnetic tape technologies; (2) magnetic disk technologies include floppy disk/diskettes, fixed hard disks (often in desktops, laptops, workstations, etc.), (3) solid-state disk (SSD) technology including DRAM and 'flash memory'; and (4) optical disk technology, including magneto-optical disks, PD, CD-ROM, CD-R, CD-RW, DVD-ROM, DVD-R, DVD-RAM, WORM, OROM, holographic, solid state optical disk technology, and so on.

SUMMARY OF THE INVENTION

Briefly described, once again, the invention includes a unique computer-implemented process, system, and computer-readable storage medium having stored thereon, executable program code and instructions for 3-D triangulation-based image acquisition of a contoured surface/object-of-interest under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right) \qquad \text{Eq. (1.1)}$$

where $I_n^p$ is the intensity of a pixel in the projector for the $n^{th}$ projected image in a particular instant/moment in time (p, to represent projector); K is an integer representing the number of component sinusoids (e.g., K=2 for a dual-frequency sinusoid pattern, K=3 for a triple-frequency sinusoid, and so on), each component sinusoid having a distinct temporal frequency, where K is less than or equal to (N+1)/2. The parameter $B_k^p$ represents constants that determine the amplitude or signal strength of the component sinusoids; $A^p$ is a scalar constant used to ensure that all values of $I_n^p$ are greater than zero, 0; $f_k$, is the spatial frequency of the $k^{th}$ sinusoid corresponding to temporal frequency k; and $y^p$ represents a spatial coordinate in the projected image. N is the total number of phase shifts—i.e., the total number of patterns—that are projected, and for each pattern projected, a corresponding image will be captured by the camera.

Images captured by the camera are defined according to the unique technique governed by the expression:

$$I_n^c = A^c + \sum_{k=1}^{K} B_k^c \cos\left(2\pi f_k y^p + \frac{2\pi k n}{N}\right) + \eta \qquad \text{Eq. (1.2)}$$

The term $\eta$ representing a noise due to a certain amount of error introduced into the image by the light sensor of the camera. To obtain (extract) phase terms from the pixels projected in accordance with Eq. 1.2, the unique expression, below, is carried-out for each k:

$$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right) \quad \text{Eq. (1.3)}$$

By way of using lookup tables (LUT) to obtain modulation (M) and phase (P) according to $$MLUT[U, V] = \frac{1}{3}[3V^2 + U^2]^{0.5} \text{ and}$$

$$PLUT[U, V] = \tan^{-1}\left[\frac{3^{0.5}V}{U}\right].$$

To carry-out phase unwrapping of, for example, a high-frequency sinusoid the following steps are taken to combine phase terms to obtain a single phase image:

$$unitPhase = \arctan\left(\frac{\cos\Sigma K_1}{\sin\Sigma K_1}\right)$$

$$highPhase = \arctan\left(\frac{\cos\Sigma K_2}{\sin\Sigma K_2}\right)/f_2$$

$$tempPhase = \text{round}\left(\frac{(unitPhase - highPhase)}{(2\pi)f_2}\right)$$

$$finalPhase = tempPhase + highPhase*(2\pi/f_2)$$

Next, a conversion of phase to X, Y, Z point clouds is implemented using the following:

$$Z^w = M_z(x^c, y^c) + N_z(x^c, y^c)T,$$

$$X^w = E_x(x^c, y^c)Z^w + F_x(x^c, y^c)$$

$$Y^w = E_y(x^c, y^c)Z^w + F_y(x^c, y^c)$$

where $$E_x(x^c, y^c) = \frac{(m_{22}^c m_{33}^c - m_{23}^c m_{32}^c)x^c + (m_{13}^c m_{32}^c - m_{12}^c m_{33}^c)y^c + (m_{12}^c m_{23}^c - m_{13}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$F_x(x^c, y^c) = \frac{(m_{22}^c m_{34}^c - m_{24}^c m_{32}^c)x^c + (m_{14}^c m_{32}^c - m_{12}^c m_{34}^c)y^c + (m_{12}^c m_{24}^c - m_{14}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$E_y(x^c, y^c) = \frac{(m_{23}^c m_{31}^c - m_{21}^c m_{33}^c)x^c + (m_{11}^c m_{33}^c - m_{13}^c m_{31}^c)y^c + (m_{13}^c m_{21}^c - m_{11}^c m_{23}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}, \text{ and}$$

$$F_y(x^c, y^c) = \frac{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)}.$$

Implementing the 7 parameters $M_z$, $N_z$, C, $E_x$, $E_y$, $F_x$, and $F_y$ by means of table look-up for indices ($x^c$, $y^c$) (camera column and row indices), reduces the total computational complexity associated with deriving the 3-D point cloud from the phase term.

BRIEF DESCRIPTION OF DRAWINGS/INCORPORATION OF ATTACHMENTS

For purposes of illustrating the innovative nature plus the flexibility of design and versatility of the new system and associated technique, as customary, figures are included. One can readily appreciate the advantages as well as novel features that distinguish the instant invention from conventional computer-implemented 3D imaging techniques. The figures as well as any incorporated technical materials have been included to communicate the features of applicants' innovation by way of example, only, and are in no way intended to limit the disclosure hereof. Each item labeled an ATTACHMENT is hereby incorporated herein by reference for purposes of providing background technical information.

FIGS. 1A-1B and 2 diagrammatically depict features and geometric relationships of a traditional 3D triangulation-based imaging technique used to find depth information for, i.e., measure/detect shape characteristics of, a surface: FIG. 1A is a sketch highlighting where the technique gets its moniker 'triangulation-based'; FIG. 1B depicts reproductions of three example PMP patterns, along with identifying orthogonal and phase directions; and FIG. 2 graphically represents the classic 'pinhole lens model' explained elsewhere.

FIGS. 3(A)-3(D) are visualizations of: the concept of wrapped phase, FIG. 3(A), and the concept of unwrapped phase, FIG. 3(B) of a foam board. A curve plot of the cross-section of the wrapped phase image 3(A) is shown in FIG. 3(C), and for the unwrapped phase image 3(B) is shown in FIG. 3(D).

FIG. 4 highlights the taxonomy of phase wrapping.

FIGS. 5-6 are diagrams schematically depicting components of an image acquisition system 100 having a camera unit 112 and projector 110, for carrying out 3-D triangulation-based imaging according to of the invention.

Figures 10A, 10B, 10C:
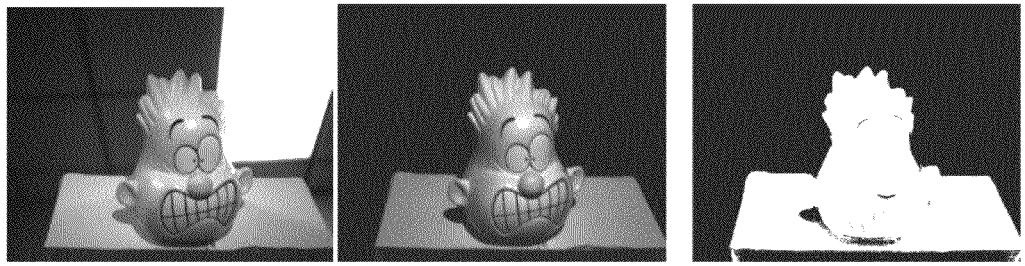

FIGS. 10(A)-10(C) are reproductions of computer-generated/implemented captured images: FIG. 10(A) is a visualization of $A^c$, the averaged pixel intensity across the PMP pattern set (e.g., FIG. 7) projected at the clown head/object, derived according to $$A^c = \frac{1}{N}\sum_{n=0}^{N-1} I_n^c$$

FIG. 10(B) is a visualization of Band FIG. 10(C) of binarized $B^c$ (also identified in FIG. 7), $B^c$ represents the intensity modulation of a given pixel derived from $I_n^c$, such that $$B^c = (S_N^2 + C_N^2)^{0.5} \text{ where } S_N = \frac{2}{N}\sum_{n=0}^{N-1}\left[I_n^c \sin\left(\frac{2\pi n}{N}\right)\right] \text{ and}$$

$$C_N = \frac{2}{N}\sum_{n=0}^{N-1}\left[I_n^c \cos\left(\frac{2\pi n}{N}\right)\right].$$

Figures 11A, 11B:
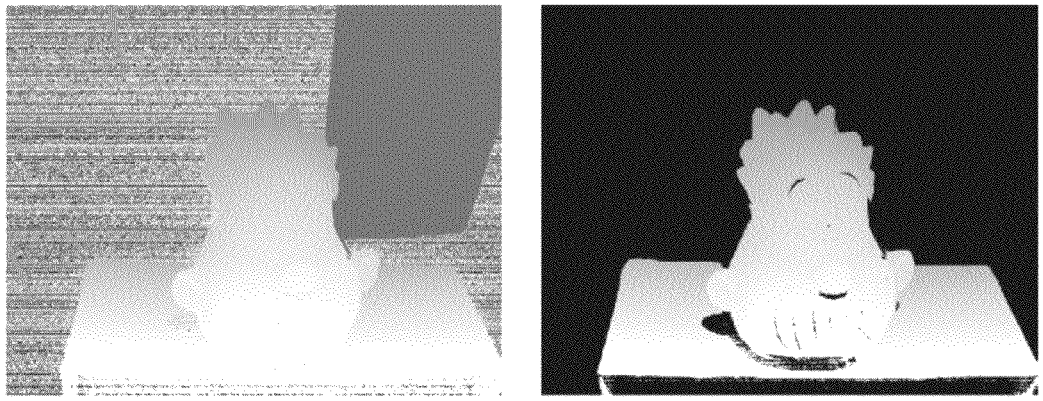

FIGS. 11(A)-11(B) are reproductions of computer-generated/implemented captured images: FIG. 11(A) is a visualization of the phase with shadow noise; FIG. 11(B) is of the phase without shadow noise (see, FIG. 7, at output of Phase Generation function).

FIGS. 12(A)-12(B) are reproductions of computer-generated/implemented images of the 3-D reconstruction of a toy object (clown head): FIG. 12(A) is a front view (see, FIG. 7, at 3D Display, the output of 3D Reconstruction function); and FIG. 12(B) is a side view.

FIG. 13 are reproductions of computer-generated/implemented images of visualizations of MLUT (left-hand column) and PLUT (right-hand column) for, respectively, N=3 (top), N=4 (middle), and N=6 (bottom).

Figure 14:
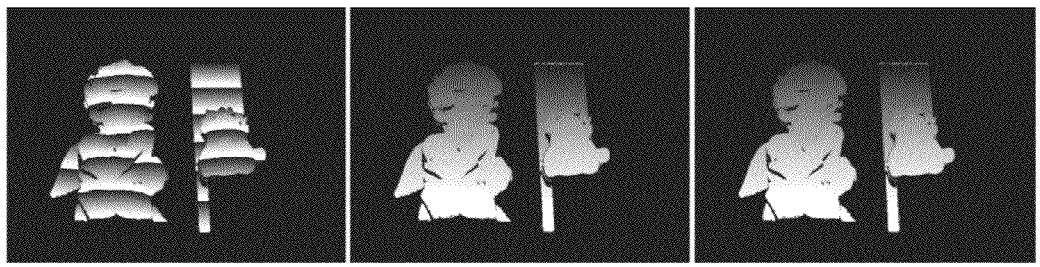

FIG. 14 are reproductions of three computer-generated/implemented images of visualization of the (left-hand) wrapped phase $\emptyset_h$ filtered by binarized $B_1^c$, the (center image) base phase $\emptyset_h$ filtered by binarized $B_1^c$, and the (right-hand) final unwrapped phase filtered by $B_1^c$.

Figure 15:
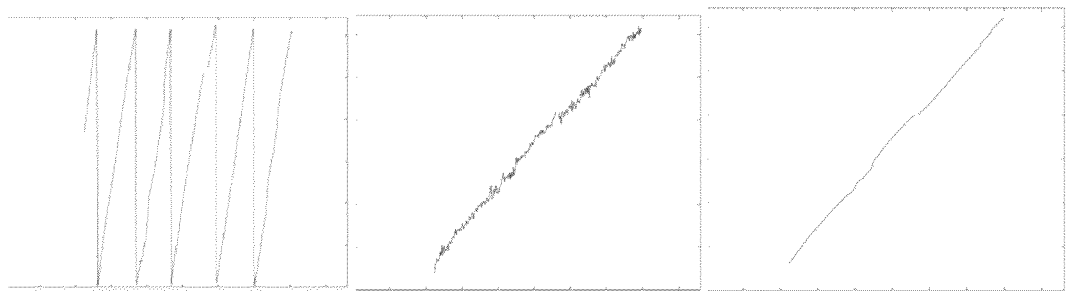

FIG. 15 are reproductions of graphical representations that correspond with each of the three images in FIG. 14 depicting cross-section at the $250^{th}$ column of the (left-hand) wrapped phase $\emptyset_h$ filtered by binarized $B_1^c$, the (center image) base phase $\emptyset_u$ filtered by binarized $B_1^c$, and the (right-hand) final unwrapped phase filtered by $B_1^c$.

Figure 16:

FIG. 16 are reproductions of six computer-generated/implemented images of sample 3-D point clouds using PMP patterns with N=4, showing various hand positions.

Figure 17:
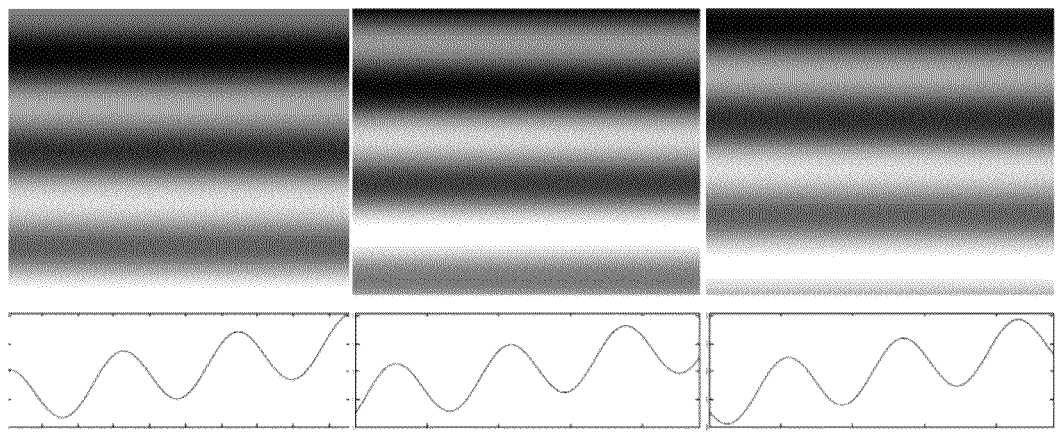

FIG. 17 are reproductions of three computer-generated/implemented images of PCMP patterns (top row of images) with $f_h=3$, $\alpha_p=200$, $\beta_p=55$, $c_1=0.5$, $c_{12}=0.5$ and $R(y^p)=2y^p-1$; shown beneath each PCMP pattern is a graphical representation of the corresponding cross-section of each pattern shown immediately above.

Figure 18:
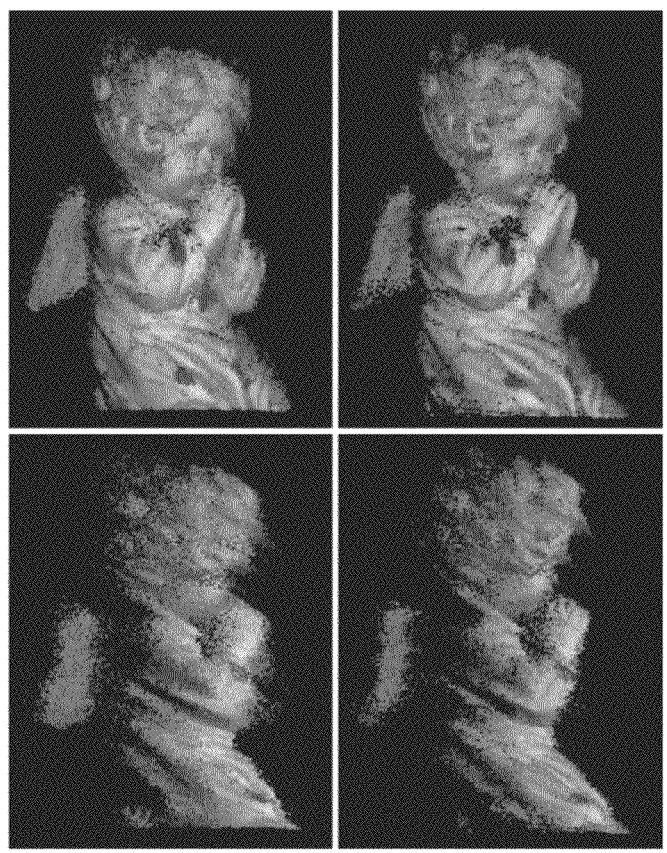

FIG. 18 are four reproductions of computer-generated/implemented images of sample 3-D reconstructed point clouds of an angle statue (the object) using 3-pattern PMP patterns (left-hand column) and 3-pattern PCMP (right-hand column) projections.

FIG. 19 is a flow diagram outlining key, as well as additional, features of a process 200 of the invention.

FIG. 20 are mathematical expressions used in carrying out the lookup table (LUT) feature of the invention.

FIGS. 21(A)-21(F) are digital images (computer generated/implemented) of MLUT and PLUT results for the k=1, k=2, and k=3 terms in connection with EXAMPLE 02. The FIG. 21(A) computer generated digital image of a human hand represents results for MLUT for k=1, the FIG. 21(B) computer generated digital image of the same human hand represents results for MLUT for k=2, FIG. 21(C) computer generated digital image of the same human hand represents results for MLUT for k=3, the FIG. 21(D) computer generated digital image of the same human hand represents results for PLUT for k=1, the FIG. 21(E) computer generated digital image of the same human hand represents results for PLUT for k=2, and the FIG. 21(F) computer generated digital image of the same human hand represents results for PLUT for k=3.

ATTACHMENT A1 is composed of sections from a doctoral dissertation manuscript entitled "Real-time 3-D Reconstruction by Means of Structured Light Illumination" authored by one of the applicants hereof, highlighting applicants' rigorous analysis and scientific effort behind the technological advancements herein, especially the materials labeled EXAMPLE 01; these sections are hereby annexed and incorporated herein by reference, to serve as an integral part of the instant patent application further evidencing the complex, multifaceted nature of problems encountered by those attempting to create solutions in the arena of 3-D image acquisition.

ATTACHMENT A2 is an in-process technical manuscript entitled "Real-time Three-Dimensional Shape Measurement of Moving Objects without Edge Errors by Time Synchronized Structured Illumination" authored by three of the applicants hereof, highlighting applicants' rigorous analysis and scientific effort behind the technological advancements outlined herein, especially the materials labeled EXAMPLE 02.

ATTACHMENT B, an article co-authored by one applicant hereof, is provided for its technical background and incorporated by reference, herein; having been published as Li, Jielin, Hassebrook, Laurence G., and Guan, Chun, "Optimized two-frequency phase-measuring profilometry light-sensor temporal-noise sensitivity," *J. Opt. Soc. Am. A*, Vol. 20, No. 1, pp. 106-115 (January 2003).

ATTACHMENT C, provided for its technical background and incorporated by reference, herein, was published as S. F. Frisken, R. N. Perry, A. P. Rockwood, and T. R. Jones, "Adaptively sampled distance fields: A general representation of shape for computer graphics," in Proceedings of the 27th annual conference on Computer graphics and interactive techniques, 249-254 (2000).

DESCRIPTION DETAILING FEATURES OF THE INVENTION

By viewing the figures incorporated below, and associated representative embodiments, along with technical materials outlined and labeled an ATTACHMENT, one can further appreciate the unique nature of core as well as additional and alternative features of the new computer-implemented process, system, and computer-readable storage medium having stored thereon, executable program code and instructions for 3-D triangulation-based image acquisition of a contoured surface-of-interest under observation by at least one camera, by projecting onto the surface-of-interest a multi-frequency pattern comprising a plurality of pixels representing at least a first and second superimposed sinusoid projected simultaneously, disclosed herein. Back-and-forth reference and association will be made to various features identified in the figures.

The overall process of 3-D triangulation-based image acquisition and reconstruction of a contour includes the following stages: First, a multi-frequency pattern is projected at the contour-of-interest comprised of pixels characterized by a first sinusoid (e.g., a unit-frequency sinusoid) embedded with a second sinusoid (e.g., a high-frequency sinusoid) producing a high-quality, wrapped phase signal. The first (e.g., unit-frequency) sinusoid is has a temporal frequency selected such that, during a demodulation temporal unwrapping step, an instantly de-codable, unwrapped-phase term is produced such that the process of spatially unwrapping the phase of the second (e.g., higher frequency) sinusoid is avoided.

Using an image sensor, data is acquired of the contour on which the multi-frequency pattern is being projected; second, generating the phase or finding the correspondence between camera and projector is preferably performed in real-time—this is very difficult for conventional pattern schemes such as frequency multiplexing and neighborhood coding one-shot SLI pattern schemes; third, 3-D point clouds are reconstructed using either phase-to-height conversion or absolute 3-D coordinates computation; and finally, the reconstructed 3-D point clouds are preferably displayed in real time.

Turning to FIGS. 5 and 6, a preferred system of the invention is illustrated, including (a) a 3-D video sequence capture unit having at least one image-capture devices for acquiring video image data—one can also acquire color texture data—of a 3-D surface-of-interest, (b) a projector unit for illuminating the surface-of-interest with the dual-frequency pattern; and (c) data processor, such as a computer or computerized unit, for carrying-out a lookup table (LUT)-based processing of the video image data acquired. The LUT-based processing comprises the steps of by implementing (querying) a modulation lookup table (MLUT) to obtain the texture map for a scanned object/contoured surface-of-interest, and implementing (querying) a phase lookup table (PLUT) to obtain a corresponding phase value(s) for the video image data.

When employing conventional 3-D triangulation-based image acquisition techniques bottlenecks include: (1) decoding the image/pixel data captured by the camera's light sensor light of the pixel patterns projected onto the contoured surface-of-interest—this bottleneck involves traditional computation of the arctangent function, and (2) deriving absolute ('world') 3-D coordinates for each pixel of the captured images/pixel data, as a result of using conventional computationally-bulky matrix inversion techniques to map phase to 3-D world coordinates. A wide variety of solutions have been attempted by others in their efforts to address these bottlenecks; such as, new pattern decoding algorithms and GPU processing, but any incremental improvement gained or noted by employing known, conventional attempts is limited due to overall complexity associated with traditional demodulation.

When higher frequency patterns are employed to improve measurement accuracy in SLI, this is done at the extra computational cost of complicated time-intensive phase unwrapping. Image processing unwrapping phase strategies generally fall into two categories: spatial (space) and temporal (time). Spatial phase unwrapping approaches assume a continuity of scanned surfaces and likely fail in regions with depth discontinuities (step edges). Temporal methods, alternatively, use the intermediate phase values typically generated by projecting several additional reference patterns and, therefore, are not efficient for real-time operation.

Figures 8A, 8B:
FIGS. 8A, 8B are reproductions of computer-generated/implemented images of patterns projected on a human hand.
Figure 8C:
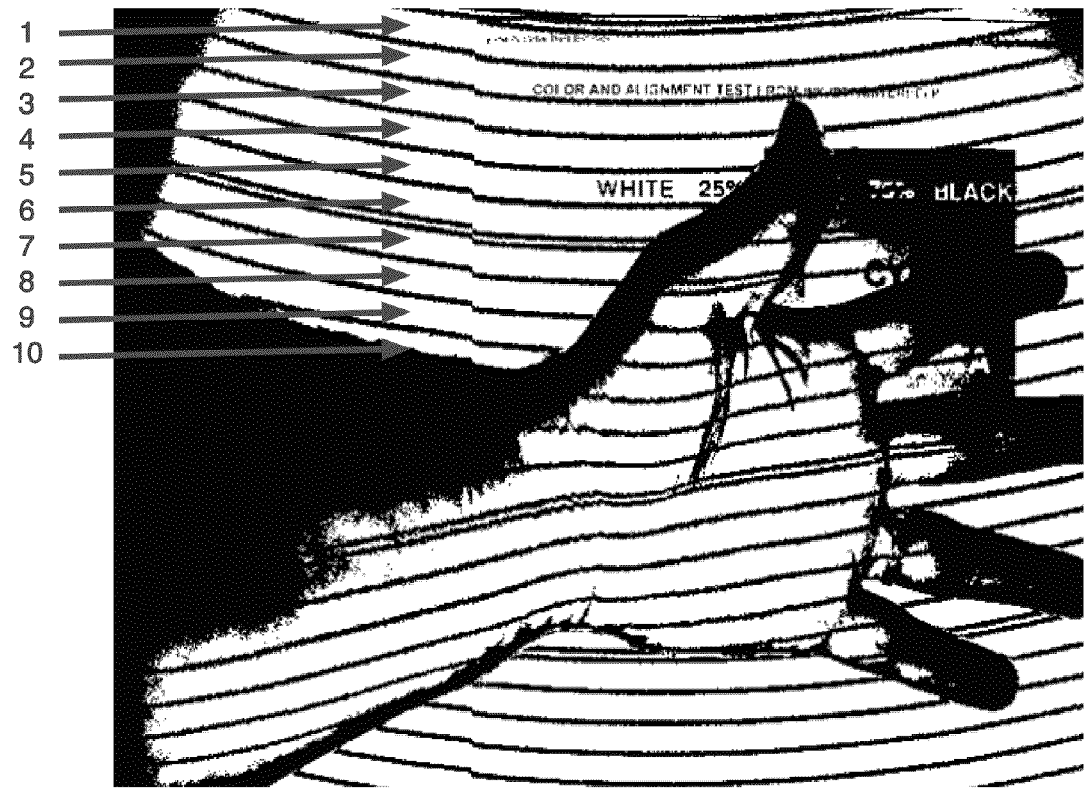
FIG. 8C is the computer-generated image of FIG. 8B, enlarged to generally view representative stripes of structured light numbered from the top 1 through 10, by way of example.
Figure 9:
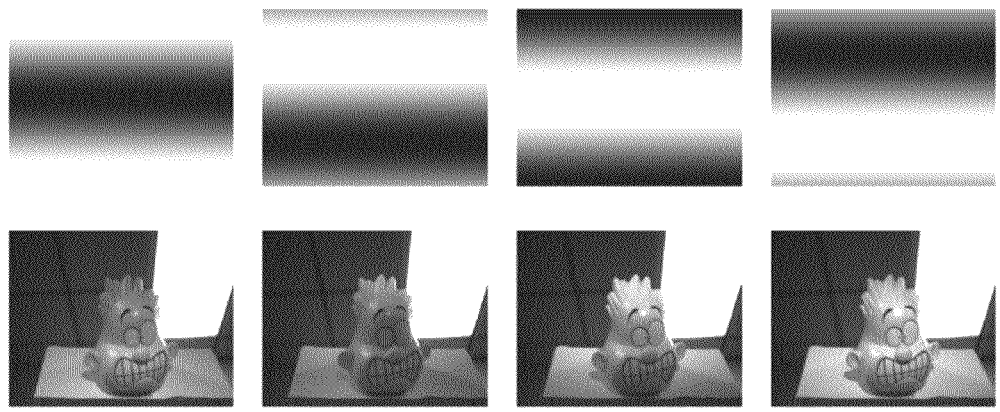
FIG. 9 are reproductions of computer-generated/implemented images of PMP patterns (top row of images) where N=4 (i.e., total of four patterns, as shown), f=1, $A^p$=127.5 and $B^p$=127.5; shown beneath each PMP pattern is the corresponding image captured by the camera during projection of the PMP pattern immediately above.

A novel multi-frequency pattern is disclosed herein: contained in each multi-frequency pattern pixel projected are at least two sinusoidal signals, each sinusoid having a distinct frequency. For example, the pixels may each contain information for a high-frequency sinusoid superimposed with a unit-frequency sinusoid, where the high-frequency sinusoid component is used to generate robust phase information, and the unit-frequency component is used to reduce phase unwrapping ambiguities. By way of example, the image in FIG. 8A is of a hand on which only a unit-frequency pattern (f=1) is being projected; FIGS. 8B, 8C are images of that hand on which a high-frequency pattern is being projected where f=20, so that twenty stripes result. Ten stripes have been counted down, as labeled, from the top of image FIG. 8C, for reference. With the instant proposed multi-pattern pattern (i.e., at least two), phase unwrapping can overcome the major shortcomings of conventional spatial phase unwrapping: phase jumping and discontinuities. Compared with conventional temporal phase unwrapped approaches, the proposed multi-frequency pattern, when projected, may achieve higher quality phase data using a fewer patterns. To process data in real time, we also propose and develop look-up table based fast and accurate algorithms for phase generation and 3-D reconstruction. Those fast algorithms can be applied to our pattern scheme as well as traditional phase measuring profilometry. For a 640×480 video stream, we can generate phase data at 1063.8 frames per second and full 3-D coordinate point clouds at 228.3 frames per second. These achievements are 25 and 10 times faster than previously reported studies.

In 3-D contour/surface acquisition, it is useful to identify each pixel explicitly; this has led to employment of several different temporal and spatial techniques for pattern creation for point discrimination, such as Binary or Gray Scale encoding or PMP. Binary/Gray Scale encoding and PMP employ multiple pattern projections that are time multiplexed, which means that the patterns occur in succession, one after each other. Performing the patterns in succession increases the time to scan for each new pattern that must be included. According to the invention, to allow real-time processing, a time sequenced dual-frequency pattern is projected on a contoured surface-of-interest, the dual-frequency pattern is comprised of a plurality of pixels.

FIGS. 5 and 6 illustrate digital isometric images of a system 20 (often referred to as a 'scanner') having a digital projector unit 110 and data capture unit, or high-resolution camera, 112 adapted to capture digital video and still images, (the camera image sensor units for video and still images may be separate or features of a single unit). Throughout the drawings, digital images (computer generated/implemented) are reproduced of several objects scanned, by way of example. A video camera may capture the video sequence of images during operation, while a high-resolution camera is used to provide the image texture that will be mapped onto the generated 3-D surface.

Phase Measuring Profilometry (PMP): Background Discussion.

As highlighted in ATTACHMENT B hereof—J. Li, L. G. Hassebrook, and C. Guan, "Optimized two-frequency phase-measuring-profilometry light-sensor temporal-noise sensitivity," 20, 106-115 (2003)—Phase Measuring Profilometry (PMP) is a known SLI technique that measures depth information from a surface using a sequence of phase shifted sinusoidally varying patterns. This known PMP technique is outlined, next, and depicted graphically in FIG. 1B. Image 10($a$) is a PMP pattern where frequency, f, equals 1; likewise, PMP pattern 10($b$) has, been generated at f=3, and PMP pattern 10($c$) has been generated at f=10. The 'Phase Direction' and 'Orthogonal Direction' are shown at a right angle with respect to one another, and labeled by way of reference. A PMP pattern sequence can be thought of as encoding rows in the camera image with values that correspond to the phase shift of a sinusoid. The sequence of projected PMP patterns generate a temporal signal (varies in time) at each pixel, such that the signal is a sinusoid, and the phase of the sinusoid is directly related to the position of the pixel along the Phase Direction. The pattern from the perspective of the projector is characterized by the following expression $$I_n(x^p, y^p) = A^p(x^p, y^p) + B^p(x^p, y^p)\cos\left(2\pi f y^p - \frac{2\pi n}{N}\right) \quad \text{Eq. (2.1)}$$

where $(x^p, y^p)$ are the coordinates of a pixel in the projector, the intensity value of the given pixel is $I_n(x^p, y^p)$, and $A^p$ and $B^p$ are constants. The p superscripts denote the expression is in projector coordinates. The f is the frequency of the sine pattern measured in cycles per image-frame, N is the total number of phase shifts for the whole sequence, and n is the current phase shift index or current frame in the time sequence. Since the equation depends only on $y^p$, the intensity value of the given pixel, $I_n(x^p, y^p)$, varies only in the $y^p$ direction. This direction is called the Phase Direction of the PMP pattern because it is the direction of the phase shift. The term Orthogonal Direction is appropriately named for the relationship with the phase direction—it lies 90 degrees from the Phase Direction along the constant $x^p$ values of the pattern. FIG. 1B illustrates examples of PMP patterns at three distinct frequencies, along with corresponding Phase and Orthogonal Directions.

Figure 7:
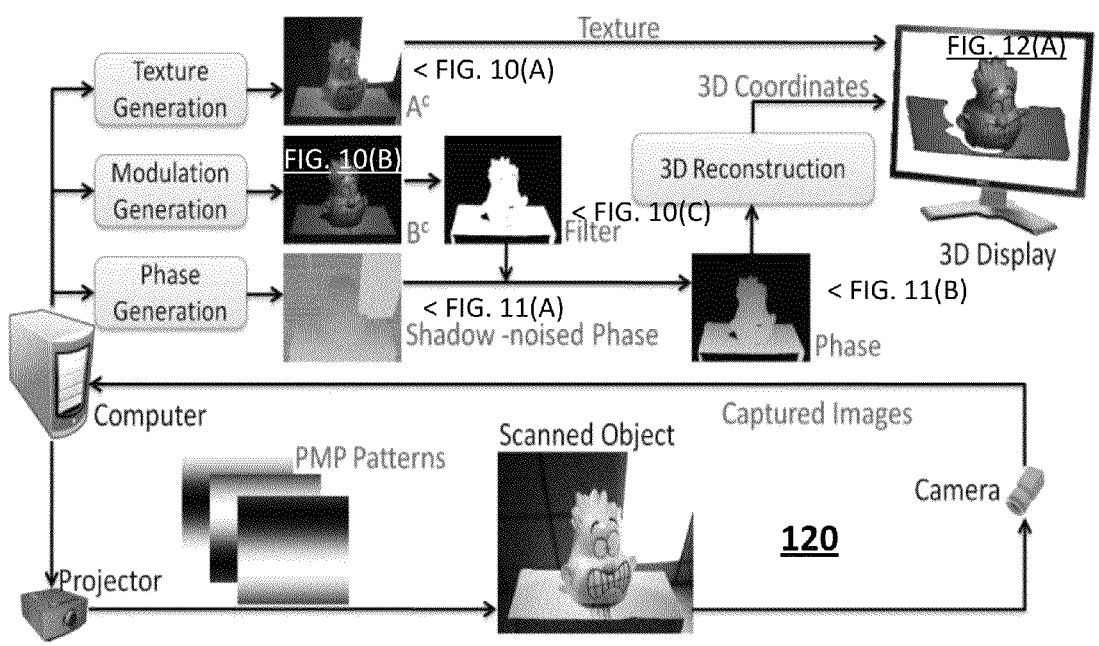
FIG. 7 is a flow diagram depicting features/components 120 employed to implement 3-D triangulation-based imaging utilizing the unique method of the invention.

PMP is depicted by FIG. 7: either vertical or horizontal sinusoid PMP patterns are projected onto a target object so that the vertical or horizontal correspondence information, between the camera and the projector, can be directly derived from the computed phase data. Parameters for the group of sine wave patterns projected as depicted in FIG. 7, by way of example, may be N=3, f=1, $A^p$=127.5 and $B^p$=127.5 for 8-bits color depth projector.

For reconstruction, a camera captures each image where the sine wave pattern is distorted by the scanned surface topology, resulting in the patterned images expressed as:

$$I_n^c(x^c, y^c) = A^c(x^c, y^c) + B^c(x^c, y^c)\cos\left(\phi(x^c, y^c) - \frac{2\pi n}{N}\right) \quad \text{Eq. (2.2)}$$

where $(x^c, y^c)$ are the coordinates of a pixel in the camera while $I_n^c(x^c, y^c)$ is the intensity of that pixel. To simplify the notation, the coordinates index both in the camera and projector will be removed from our equation henceforth. The term $A^c$ is the averaged pixel intensity across the pattern set, which can be derived according to:

$$A^c = \frac{1}{N}\sum_{n=0}^{N-1} I_n^c \quad \text{Eq. (2.3)}$$

such that the image $A^c$ is equal to an intensity or texture photograph of the scene. Correspondingly, the term $B^c$ is the intensity modulation of a given pixel and is derived from $I_n^c$ as:

$$B^c = \frac{2}{N}\left\{\left[\sum_{n=0}^{N-1} I_n^c \sin\left(\frac{2\pi n}{N}\right)\right]^2 + \left[\sum_{n=0}^{N-1} I_n^c \cos\left(\frac{2\pi n}{N}\right)\right]^2\right\}^{0.5}, \quad \text{Eq. (2.4)}$$

such that $B^c$ can be thought of as the amplitude of the sinusoid reflecting off of a point on the target surface. If $I_n^c$ is constant or less affected by the projected sinusoid patterns, $B^c$ will be close to zero. Thus $B^c$ is employed as a shadow noise detector/filter such that the shadow-noised regions, with small BC values, are discarded from further processing. FIG. 7 shows an example scene with a background that includes a fluorescent ceiling light, which over-saturates the CMOS cameras pixel and, thereby, erases any signal from the SLI projector. In FIG. 7, $A^c$ looks like a standard video frame absent any indication of the projected pattern sequence $I_n^p$. In contrast, $B^c$, shown in FIG. 7 looks very similar to $A^c$ except that it only shows texture in those areas of the scene that significantly reflect the projected sequence $I_n^p$. Given the significance of $B^c$ as an indicator of the projected signal strength, the binarized image in FIG. 7 shows only those pixels greater in magnitude to a user defined threshold. It is these pixels that, by way of example, can ultimately be used to reconstruct the 3-D surface with ignored pixels being considered too noisy for relaying an reliable depth information.

In order to triangulate to, a specific point, a point's position in both camera and projector space must be known. While the camera position is known explicitly due to captured image being in camera space, the projector points are determined by matching a phase value measured at a point to that same phase value in the sinusoidally varying pattern. The phase value at each pixel captured in the camera space, $\phi(x^c, y^c)$, is determined by projecting N phase shifted patterns at the target and processing a sequence of N images by carrying out, the following expression for the reliable pixels with sufficiently large, $B^c$ $$\phi(x^c, x^c) = \arctan\left[\frac{\sum_{n=1}^{N} I_n(x^c, y^c)\sin(2\pi n/N)}{\sum_{n=1}^{N} I_n(x^c, y^c)\cos(2\pi n/N)}\right] \quad \text{Eq. (2.5)}$$

where n denotes an index into the image sequence and $I_n(x^c, y^c)$ is the pixel intensity value at the position $(x^c, y^c)$ in the $n^{th}$ image in the sequence.

For a pattern frequency, f=1, often termed a base frequency since it is a pattern of a single period of sinusoidal variation, the phase, $\phi$, is readily mapped to a projector frame percentage along the Phase Direction according to the expression $$y^p = \frac{\phi(x^c, y^c)}{2\pi f} \quad \text{Eq. (2.6)}$$

Notice that $y^p$ is not actually a coordinate in the projector space, but it is a value ranging from 0 to 1 that denotes a percentage of the distance between the bottom of the projector frame and the top.

An ambiguous phase problem occurs when increasing the frequency beyond 1 even though better depth resolution can be achieved through the use of higher frequency patterns. The problem is due to the periodic nature in sinusoids, and can be explained by examining the phase variation in $\phi(x^c, y^c)$ and comparing it to the expression immediately, above. The variation in $\phi(x^c, y^c)$ is always from 0 to $2\pi$ but at f>1 the above expression will only vary between 0 and 1/f. So at higher frequencies, this creates what is called a repeated—or wrapped phase image—that requires 'unwrapping' to fully acquire the unambiguous phase value for the correct $y^p$ coordinate. In digital image processing it is known that, while accuracy of phase shifting patterns tends to increase with the number of periods, this increase comes with it the cost of depth ambiguity.

Figure 3A:
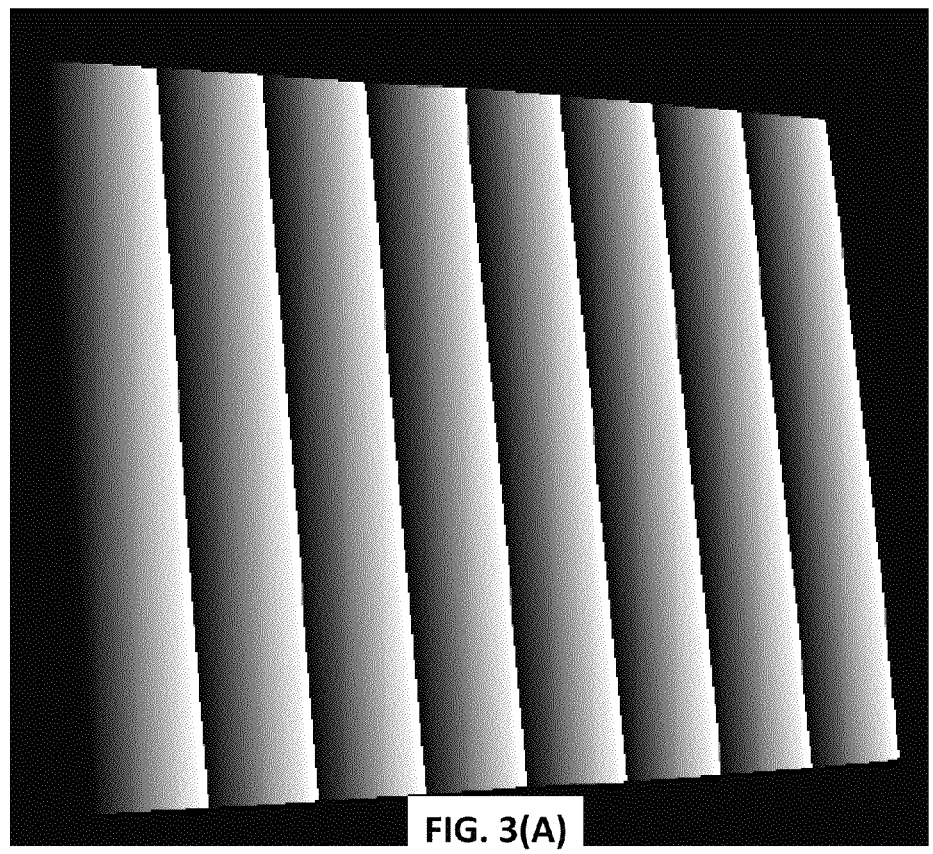
Figure 3C:
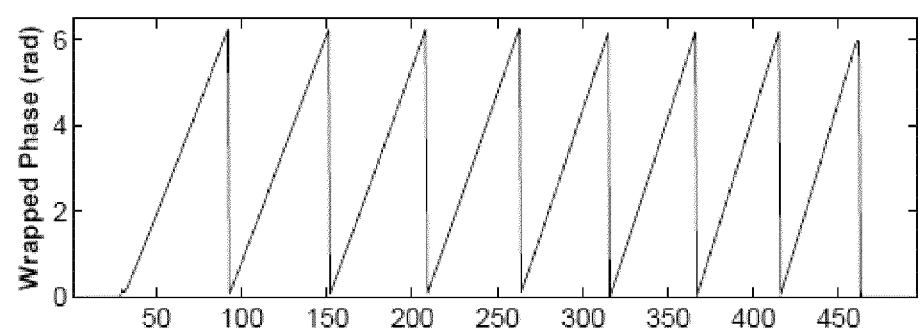
Figure 3B:
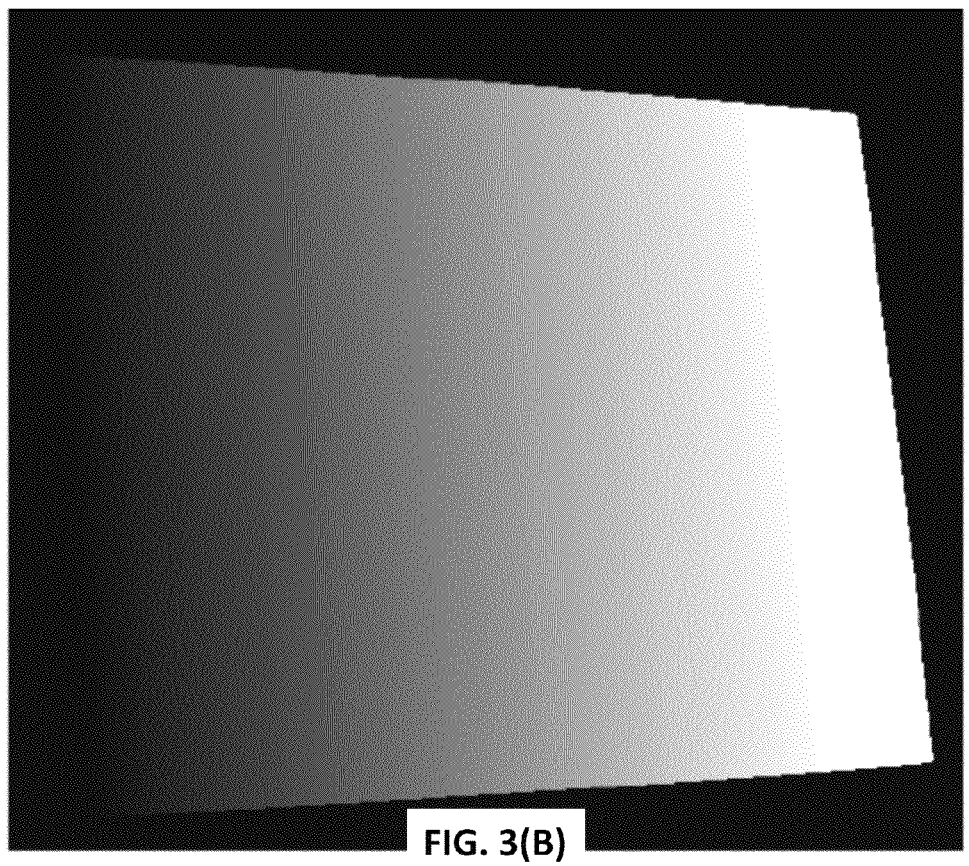
Figure 3D:
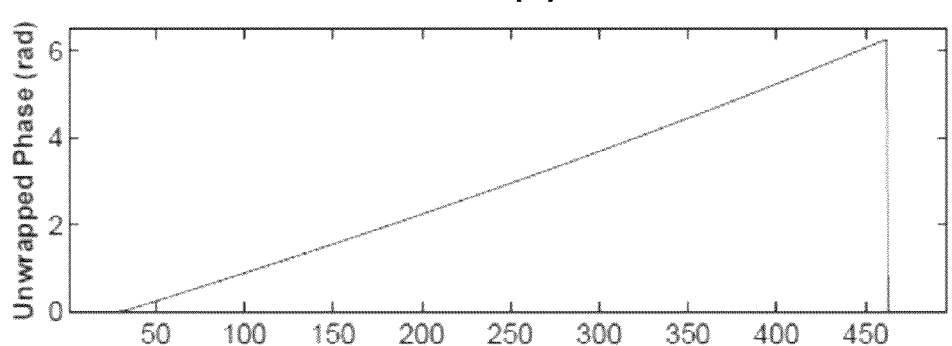

In a general sense, phase unwrapping ensures that all appropriate multiples of $2\pi$ have been included in the phase response (i.e., the complex angle of the frequency response). When phase is constrained to an interval such as $-\pi, \pi$ or $0, 2\pi$ it is deemed a wrapped phase; when not so constrained it is an unwrapped phase. A mathematical description of phase unwrapping is $\phi=\psi+2k\pi$, where $\phi$ is the unwrapped phase, $\psi$ is the wrapped phase, and k is an integer counting the number of $2\pi$ multiples. FIGS. 3(A)-3(D) are visualizations of the concept of wrapped phase, FIG. 3(A), and the concept of unwrapped phase, FIG. 3(B) of a foam board. A curve plot of the cross-section of the wrapped phase image is shown in FIG. 3(C), and for the unwrapped phase image, FIG. 3(D). For unwrapping phase in the context of digital image processing, typically there are two principal strategies: spatial and temporal. By way of background, FIG. 4 depicts the taxonomy of phase unwrapping. In spatial approaches, only a single wrapped phase map is employed and the unwrapped phase of a subject pixel is derived according to the phase values within a local spatial neighborhood about the pixel. These methods have a tendency to fail in regions surrounding discontinuities in depth (step edges). Temporal methods use the intermediate phase values typically generated by projecting several additional unit-frequency patterns and, therefore, are not efficient for real-time operation.

Figure 2:
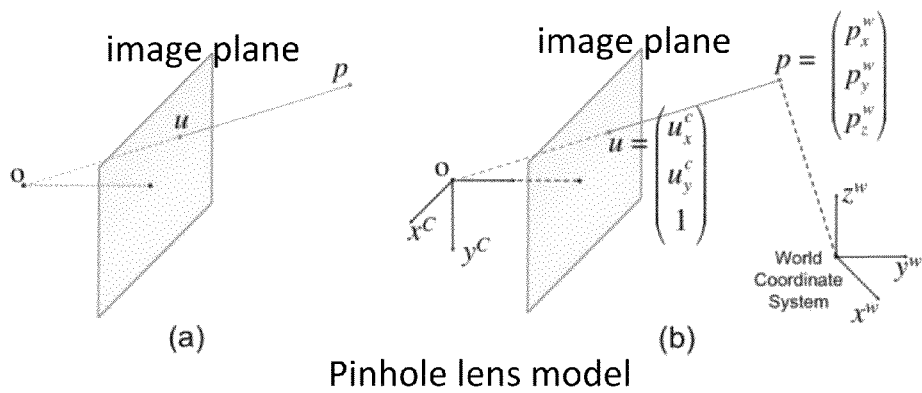

Triangulation is based upon known geometric relationships to determine the points in a spatial coordinate system. FIG. 2 is a simple sketch of a pinhole lens model to aid in visualizing triangulation. The 'ideal' pinhole model represented by FIG. 2 uses a single point o called the center of projection, and a plane termed the image plane. When a line is traced from a point in the 3-D world space to the center of projection the line intersects the image plane at a single point, at u. The mapping of the point p in the 3-D coordinate system to the intersected point, u, on the 2-D image plane is called the perspective projection and is described by the expression $$\lambda \begin{pmatrix} u_x \\ u_y \\ 1 \end{pmatrix} = \begin{pmatrix} p_x \\ p_y \\ p_z \end{pmatrix} \qquad \text{Eq. (2.7)}$$

where the center of projection is located on the origin of the world coordinate system for the ideal model and $\lambda$ is a non-zero scalar. The camera coordinate system and world coordinate system are both represented in FIG. 2. The 3-D point p has world coordinates described by the vector $p^w=(p_x^w, p_y^w, p_z^w)^T$ and camera coordinates described by the vector $p^c=(p_x^c, p_y^c, p_z^c)^T$. These two vectors are related by the affine transformation specified by the rotation matrix $R \in \mathbb{R}^{3\times 3}$ and the translation vector $T \in \mathbb{R}^3$, such that $$p^c = Rp^w + T \qquad \text{Eq. (2.8)}$$

Applying the assumption that the camera and projector are adequately modeled using the pinhole lens model, their perspective matrices, $M^c$ (camera) and $M^p$ (projector) are given by:

$$M^c = \begin{pmatrix} m_{11}^c & m_{12}^c & m_{13}^c & m_{14}^c \\ m_{21}^c & m_{22}^c & m_{23}^c & m_{24}^c \\ m_{31}^c & m_{32}^c & m_{33}^c & m_{34}^c \end{pmatrix} \qquad \text{Eq. (2.9)}$$

and $$M^p = \begin{pmatrix} m_{11}^p & m_{12}^p & m_{13}^p & m_{14}^p \\ m_{21}^p & m_{22}^p & m_{23}^p & m_{24}^p \\ m_{31}^p & m_{32}^p & m_{33}^p & m_{34}^p \end{pmatrix}.$$

A benefit of performing PMP in only the $y^p$ direction is that the equations become simpler, and only three parameters ($x^c$, $y^c$, $y^p$) are necessary for triangulating the corresponding world coordinate for each pixel. Of the required parameters, the camera coordinates ($x^c, y^c$) are known explicitly, while the $y^p$ value is determined by the specific method for SLI. The 3-D world coordinates $X^w$, $Y^w$, and $Z^w$ are defined conventionally according as $$\begin{pmatrix} X^w \\ Y^w \\ Z^w \end{pmatrix} = \begin{pmatrix} m_{11}^c - m_{31}^c x^c, & m_{12}^c - m_{32}^c x^c, & m_{13}^c - m_{33}^c x^c \\ m_{21}^c - m_{31}^c y^c, & m_{22}^c - m_{32}^c y^c, & m_{23}^c - m_{33}^c y^c \\ m_{21}^p - m_{31}^p y^p, & m_{22}^p - m_{32}^p y^p, & m_{23}^p - m_{33}^p y^p \end{pmatrix}^{-1} \qquad \text{Eq. (2.10)}$$

$$\begin{pmatrix} m_{14}^c - m_{34}^c x^c \\ m_{24}^c - m_{34}^c y^c \\ m_{24}^p - m_{34}^p y^p \end{pmatrix}.$$

It is this matrix inversion as well as the arctangent computation in Eq. (2.5) that has proven bottlenecks in preventing real-time surface reconstruction using conventional techniques.

Example 01

New Technique

In their U.S. Provisional Patent Application No. 61/371, 626, two examples of applicants' new multi-frequency pattern were introduced in terms of analogies to traditional electrical circuitry signal/current propagation types: An AC (alternating current) flavor and an DC (direct current) flavor. Applicants coined the multi-frequency pattern fashioned after principals governing AC as "Dual-frequency Phase Multiplexing" (DFPM); and coined multi-frequency pattern fashioned after principals governing DC as "Period Coded Phase Measuring" (PCPM) functioning according to principals governing DC. The example called DFPM patterns comprised two superimposed sinusoids, one a unit-frequency phase sine wave and the other a high-frequency phase sine wave, whereby after receiving/acquiring the pattern data by an image sensor, the phase of the two patterns is separated. The unit-frequency phase is used to unwrap the high-frequency phase. The unwrapped high-frequency phase is then employed for 3-D reconstruction. PCPM patterns is an example of considering DC current propagation, whereby the period information is embedded directly into high-frequency base patterns; such that, the high-frequency phase can be unwrapped temporally.

A unit-frequency sinusoid (in this context, 'unit' refers to having a magnitude value of 1) is superimposed on a high-frequency sinusoid, the unit-frequency sinusoid and high-frequency sinusoid being projected simultaneously (i.e., effectively 'on top of one another' over a selected epoch/ duration of frames, n) from a projection unit, or projector, as a plurality of pixels such that each of the pixels projected satisfy the expression $$I_n^p = A^p + B_1^p \cos\left(2\pi f_h y^p - \frac{2\pi n}{N}\right) + B_2^p \cos\left(2\pi f_u y^p - \frac{4\pi n}{N}\right)$$

where $I_n^p$ is the intensity of a pixel in the projector, $A^p$, $B_1^p$, and $B_2^p$ are constants set such that the value of $I_n^p$ falls between a target intensity range, (e.g., between 0 and 255 for an 8-bit color depth projector), f, is the high frequency of the sine wave, $f_u$ is the 'unit' frequency of the sine wave. The unit-frequency signal/sinusoid is used during a demodulation step to produce a decodable, unwrapped-phase term temporally. As stated above, for reconstruction, a camera captures each image where the sine wave pattern is distorted by the scanned surface topology, resulting in the patterned images expressed as:

$$I_n^c(x^c, y^c) = A^c(x^c, y^c) + B^c(x^c, y^c)\cos\left(\phi(x^c, y^c) - \frac{2\pi n}{N}\right) \quad \text{Eq. (2.2)}$$

where ($x^c$, $y^c$) are the coordinates of a pixel in the camera while $I_n^c(x^c, y^c)$ is the intensity of that pixel. For this case, Eq. (2.2) reduces to a form of Eq. (1.2) and becomes:

$$I_n^c A^c + B_1^c \cos\left(\phi_h - \frac{2\pi n}{N}\right) + B_2^c \cos\left(\phi_u - \frac{4\pi n}{N}\right), \quad (9)$$

where $I_n^c$ is the intensity of a pixel in the camera. The term $A^c$ is still the averaged pixel intensity across the pattern set, which can be derived by Eq. 3 such that the image $A^c$ is equal to an intensity or texture photograph of the scene. Correspondingly, the term $B_1^c$ is the intensity modulation of a given pixel corresponding to $\phi_h$ and is derived from $I_n^c$, as:

$$B_m^c = \frac{2}{N}\left\{\left[\sum_{n=0}^{N-1} I_n^c \sin\left(m\frac{2\pi n}{N}\right)\right]^2 + \left[\sum_{n=0}^{N-1} I_n^c \cos\left(m\frac{2\pi n}{N}\right)\right]^2\right\}^{0.5}, \quad (10)$$

with m=1 such that $B_1^c$ can be thought of as the amplitude of the sinusoid reflecting off of a point on the target surface.

Similar to traditional PMP, if $I_n^c$ is constant or less affected by the projected sinusoid patterns, then $B_1^c$ will be close to zero, indicating that $B_1^c$ is very sensitive to noise in either the camera, projector, and/or ambient light. Thus $B_1^c$ is employed as an indicator of the signal to noise ratio such that excessively noisy regions, with small $B_1^c$ values, are discarded from further processing [25]. $B_2^c$ is derived from $I_n^c$ by Eq. 10 with m=2 and it is the intensity modulation corresponding to $\phi_u$. Of the reliable pixels with sufficiently large $B_1^c$, the phase-pair, $(\phi_h, \phi_u)$, is derived as:

$$(\phi_h, \phi_u) = \left(\tan^{-1}\left[\frac{\sum_{n=0}^{N-1} I_n^c \sin\left(\frac{2\pi n}{N}\right)}{\sum_{n=0}^{N-1} I_n^c \cos\left(\frac{2\pi n}{N}\right)}\right], \tan^{-1}\left[\frac{\sum_{n=0}^{N-1} I_n^c \sin\left(\frac{4\pi n}{N}\right)}{\sum_{n=0}^{N-1} I_n^c \cos\left(\frac{4\pi n}{N}\right)}\right]\right), \quad (11)$$

where $\phi_h$ represents the wrapped phase value of the captured pattern and $\phi_u$ represents the base phase used to unwrap $\phi_h$.

LUT-Based Processing

LUT-based programming is a well known and widely used technique for minimizing processing latency. Implementing LUT-based processing, uniquely derived are modulation $B^c$, and phase, $\phi$, terms for traditional PMP suitable for all triangulation-based 3-D measurement, including the dual-frequency pattern set detailed in this EXAMPLE 01.

Modulation

Uniquely, to reduce computational complexity associated with conventional techniques, modulation $B^c$ is reduced to $$B^c = \frac{1}{3}[3(I_1^c - I_2^c)^2 + (2I_0^c - I_1^c - I_2^c)^2]^{0.5} \quad (12)$$

for N = 3, $$B^c = \frac{1}{2}[(I_1^c - I_3^c)^2 + (I_0^c - I_2^c)^2]^{0.5} \quad (13)$$

for N = 4, or $$B^c = \frac{1}{6}[3(I_1^c + I_2^c - I_4^c - I_5^c)^2 + (2I_0^c - 2I_3^c + I_1^c - I_2^c - I_4^c + I_5^c)^2]^{0.5} \quad (14)$$

for N=6. Noting that we need only salve these equations for 8-bits per pixel $I_n^c$, images, we can implement a modulation look-up table, MLUT, that, for N=3, is defined according to $$MLUT[U, V] = \frac{1}{3}[3V^2 + U^2]^{0.5}, \quad (15)$$

where integer indices V and U are derived from $$V = I_1^c - I_2^c \text{ and } U = 2I_0^c - I_1^c - I_2^c; \quad (16)$$

for N=4, is defined according to $$MLUT[U, V] = \frac{1}{2}[V^2 + U^2]^{0.5}, \quad (17)$$

where integer indices V and U are derived from $$V = I_1^c - I_3^c \text{ and } U = I_0^c - I_2^c; \quad (18)$$

or for N=6, is defined according to $$MLUT[U, V] = \frac{1}{6}[3V^2 + U^2]^{0.5}, \quad (19)$$

where integer indices V and U are derived from $$V = I_1^c + I_2^c - I_4^c - I_5^c \text{ and } U = 2I_0^c - 2I_3^c + I_1^c - I_2^c - I_4^c + I_5^c. \quad (20)$$

The double-precision results of Eq. (15), (17) or (19) are stored in the MLUT. In contrast to Eq. (4). MLUT reduces the run-time computation cost of modulation without losing accuracy, where the size of the LUT is determined by the number of bits per pixel of the camera sensor and the number of patterns being projected.

For our proposed dual-frequency pattern scheme, the minimum number of patterns is 5, but to take advantage of our LUT-based processing, we set the number of patterns to 6 where the modulation terms $B_1^c$ and $B_2^c$; in Eq. (9), are described as:

$$B_1^c = \frac{1}{6}[3(I_1^c + I_2^c - I_4^c - I_5^c)^2 + (2I_0^c - 2I_3^c + I_1^c - I_2^c - I_4^c + I_5^c)^2]^{0.5} \quad (21)$$

and $$B_2^c = \frac{1}{6}[3(I_1^c - I_2^c + I_4^c - I_5^c)^2 + (2I_0^c + 2I_3^c - I_1^c - I_2^c - I_4^c + I_5^c)^2]^{0.5}. \quad (22)$$

In practice, we need only calculate $B_1^c$ as a shadow filter and for representing object texture. The MULT for $B_1^c$ is the same as Eq. (19).

4.2. Phase

As our second step to producing real-time 3-D video with texture, we intend to minimize the computational complexity associated with generating phase video where the arctangent function has long been considered a significant obstacle for fringe pattern analysis [26]. Previous approaches to this problem include Huang et al.'s cross ratio algorithm [22] and Guo et al.'s approximation algorithm [26]. However, these methods reduce computational cost at the expense of accuracy and are not faster than our LUT-based algorithms.

As we did with Eq. (4) for $B^c$, we simplify Eq. (5) according to the number of patterns N such that $$\phi = \tan^{-1}\left[\frac{3^{0.5}(I_1^c - I_2^c)}{2I_0^c - I_1^c - I_2^c}\right] \quad (23)$$

for $N = 3$.

$$\phi = \tan^{-1}\left[\frac{I_1^c - I_3^c}{I_0^c - I_2^c}\right] \quad (24)$$

for $N = 4$, or $$\phi = \tan^{-1}\left[\frac{3^{0.5}(I_1^c + I_2^c - I_4^c - I_5^c)}{2I_0^c - 2I_3^c + I_1^c - I_2^c - I_4^c + I_5^c}\right] \quad (25)$$

for N=6. Again based on the fact that the intensity values of grabbed images are range-limited integers, we can implement these calculations through a phase LUT (PLUT), for N=3, defined according to $$PLUT[U, V] = \tan^{-1}\left[\frac{3^{0.5}V}{U}\right], \quad (26)$$

where U and V are defined in Eq. (16); for N=4, defined according to $$PLUT[U, V] = \tan^{-1}\left[\frac{V}{U}\right], \quad (27)$$

where U and V are defined in Eq. (18); or for N=6, defined according to $$PLUT[U, V] = \tan^{-1}\left[\frac{3^{0.5}V}{U}\right], \quad (28)$$

where U and V are defined in Eq. (20). The double-precision results are stored in the PLUT. Thus, the nine-consuming arctangent operation is pre-performed, and phase values are obtained by accessing the pre-computed PLUT whose size is, again, determined by the number of bits per pixel of the sensor as well as the number of patterns projected with no loss in accuracy. Compared to Eqs. (5), PLUT avoids computing arctangent function at run-time such that the computational cost of phase is greatly reduced without introducing distortion.

For our proposed dual-frequency pattern scheme, the more accurate wrapped phase $\phi_h$ and the coarse unit frequency phase $\phi_u$ pair in the Eq. (8) is rewritten as $$(\phi_h, \phi_u) = \begin{pmatrix} \tan^{-1}\left[\frac{3^{0.5}(I_1^c + I_2^c - I_4^c - I_5^c)}{2I_0^c - 2I_3^c + I_1^c - I_2^c - I_4^c + I_5^c}\right], \\ \tan^{-1}\left[\frac{3^{0.5}(I_1^c - I_2^c + I_4^c - I_5^c)}{2I_0^c + 2I_3^c - I_1^c - I_2^c - I_4^c - I_5^c}\right] \end{pmatrix} \quad (29)$$

The PLUT for $\phi_h$ is the same as the Eq. (28), and the PLUT for $\phi_u$ is defined as $$PLUT[U, V] = \tan^{-1}\left[\frac{3^{0.5}V}{U}\right], \quad (30)$$

where V and U are derived from $$V = I_1^c - I_2^c + I_4^c - I_5^c \text{ and } U = 2I_0^c + 2I_3^c - I_1^c - I_2^c - I_4^c - I_5^c. \quad (31)$$

Once $\phi_h$ and $\phi_u$ are obtained, phase unwrapping can be also achieved in real-time.

4.3. 3-D Point Cloud

Having obtained both the phase and modulation images by means of LUTs, we begin our derivation of a LUT for the purpose of implementing Eq. (7). After matrix inverse and matrix multiplication operations. Eq (7) can be expanded into direct algebraic forms as $$X^w = M_x(x^c, y^c) + N_x(x^c, y^c)T$$

$$Y^w = M_y(x^c, y^c) + N_y(x^c, y^c)T$$

$$Z^w = M_z(x^c, y^c) + N_z(x^c, y^c)T.$$

where $T = (C(x^c, y^c)y^p + 1)^{-1}$ and $M_x$, $M_y$, $M_z$, $N_x$, $N_y$ and $N_z$, are defined in the Appendix.

We then note that, based on the mapping of world coordinates to the camera plane [7] by $M^c$, if $Z^w$ is calculated according to $$Z^w = M_z(x^c, y^c) + N_z(x^c, y^c)T, \quad (32)$$

then $X^w$ and $Y^w$ can be computed as $$X^w = E_x(x^c, y^c)Z^w + F_x(x^c, y^c) \text{ and } Y^w = E_y(x^c, y^c)Z^w + F_y(x^c, y^c), \quad (33)$$

where $$E_x(x^c, y^c) = \frac{(m_{22}^c m_{33}^c - m_{23}^c m_{32}^c)x^c + (m_{13}^c m_{32}^c - m_{12}^c m_{33}^c)y^c + (m_{12}^c m_{23}^c - m_{13}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

$$F_x(x^c, y^c) = \frac{(m_{22}^c m_{34}^c - m_{24}^c m_{32}^c)x^c + (m_{14}^c m_{32}^c - m_{12}^c m_{34}^c)y^c + (m_{12}^c m_{24}^c - m_{14}^c m_{22}^c)}{(m_{21}^c m_{32}^c - m_{22}^c m_{31}^c)x^c + (m_{12}^c m_{31}^c - m_{11}^c m_{32}^c)y^c + (m_{11}^c m_{22}^c - m_{12}^c m_{21}^c)},$$

-continued $$E_y(x^c, y^c) = \frac{(m^c_{23}m^c_{31} - m^c_{21}m^c_{33})x^c + (m^c_{11}m^c_{33} - m^c_{13}m^c_{31})y^c + (m^c_{13}m^c_{21} - m^c_{11}m^c_{23})}{(m^c_{21}m^c_{32} - m^c_{22}m^c_{31})x^c + (m^c_{12}m^c_{31} - m^c_{11}m^c_{32})y^c + (m^c_{11}m^c_{22} - m^c_{12}m^c_{21})},$$

and $$F_y(x^c, y^c) = \frac{(m^c_{21}m^c_{32} - m^c_{22}m^c_{31})x^c + (m^c_{12}m^c_{31} - m^c_{11}m^c_{32})y^c + (m^c_{11}m^c_{22} - m^c_{12}m^c_{21})}{(m^c_{21}m^c_{32} - m^c_{22}m^c_{31})x^c + (m^c_{12}m^c_{31} - m^c_{11}m^c_{32})y^c + (m^c_{11}m^c_{22} - m^c_{12}m^c_{21})}.$$

Implementing the 7 parameters $M_z$, $N_z$, $C$, $E_x$, $E_y$, $F_x$, and $F_y$ by means of table look-up for indices $(x^c,y^c)$ (camera column and row indices), reduces the total computational complexity associated with deriving the 3-D point cloud from the phase term to 7 look-ups. 4 additions, 3 multiplications, and 1 division, which is significantly less than what is involved in performing matrix inversion and matrix multiplication, as required by Eq. (7). It should be noted that the method presented in Eqs. (32) and (33) can be applied to all triangulation-based, 3-D coordinate, reconstruction techniques including stereo vision, 3-D from video, time-of-flight, and so on. FIG. 20 outlines the details of useable definitions of $M_x$, $M_y$, $M_z$, $N_x$, $N_y$, and $N_z$.

Example 02

New Technique Expanded

FIGS. 21(A)-(F) are reproductions of the MLUT and PLUT results for the k=1, k=2, and k=3 terms, utilizing the dual-frequency sinusoid patterns set out in EXAMPLE 01. The MLUT values for k=1 and k=2 is an indicator of how reliable the PLUT values are. Larger values of MLUT for k=1 and k=2 are preferable. Large values for MLUT on k=3 are undesirable because that is an indication of error or movement during scanning. It is preferable to obtain small values for MLUT on k=3. Where values on MLUT for k=3 that are relatively large, the pixels are discarded and no XYZ points are generated for them.

Structured light illumination is a process of 3-D imaging where a series of time-multiplexed, striped patterns are projected onto a target scene with the corresponding captured images used to determine surface shape according to the warping of the projected patterns around the target. In a real-time system, a high-speed projector/camera pair are used such that any surface motion is small over the projected pattern sequence, but regardless of acquisition speed, there are always those pixels near the edge of a moving surface that capture the projected patterns on both foreground and background surfaces. These edge pixels then create unpredictable results that typically require expensive processing steps to remove, but in this paper, we introduce a novel filtering process that identifies motion artifacts based upon the discrete Fourier transform applied to the time axis of the captured pattern sequence.

Figure 1A:
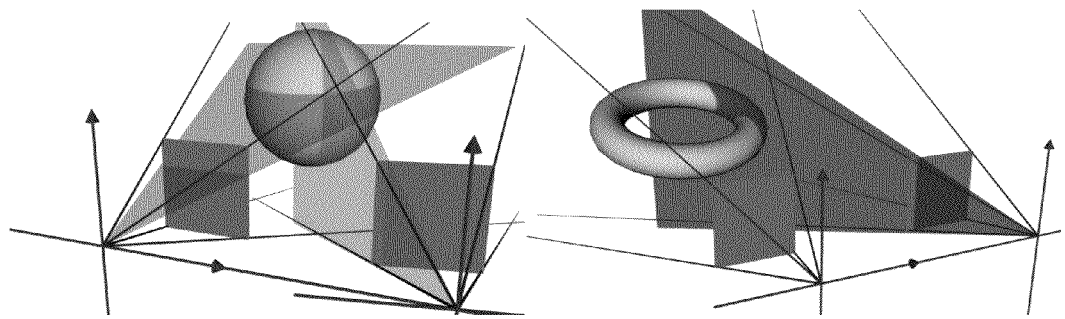
Figure 1B:
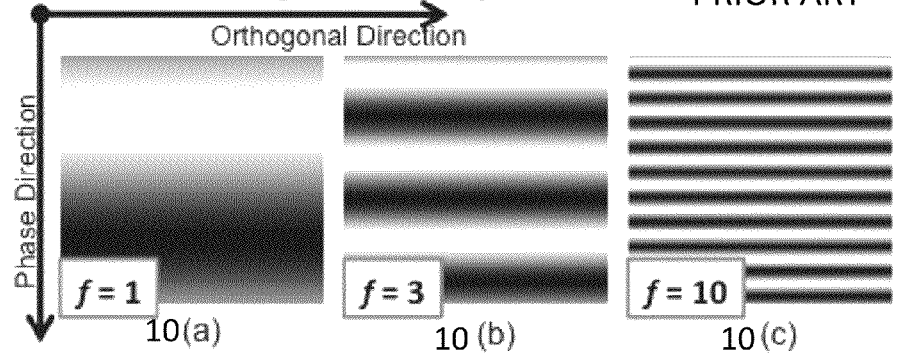

Reference made to FIG. 1 and FIG. 2 in this EXAMPLE 02 are figures depicted in ATTACHMENT A2, a manuscript authored by three of the applicants hereof, incorporated herein by reference as an integral part of this description, to the extent consistent herewith. In this EXAMPLE 02, the advancements set forth in EXAMPLE 01 are referred to as "Liu et al"—in this EXAMPLE 02 LUT filtering can be used to detect and remove edge pixels without a significant performance penalty. Herein, is a modeling of fringe pattern processing as a discrete Fourier transform where discontinuities in phase, near edges of moving objects, can be detected by looking at the non-principal frequencies which, without motion, would only contain low-level, addictive, white noise components. These non-principal frequencies can be extracted from the captured images, using look-up tables.

Herein, to carry out the unique features of the technique described in this EXAMPLE 02, the commonly used SLI technique of phase measuring profilometry (PMP), was employed. Like stereo-vision, PMP attempts to reconstruct a 3-D object surface by triangulating between the pixels of a digital camera, defined by to coordinates $(x^c, y^c)$, and projector $(N^p, y^p)$. And, assuming that the camera is epipolar rectified to the projector along the x axis, one need match $(x^c, y^c)$ to a $y^p$ coordinate. As such, SLI encodes/modulates $y^p$ coordinates of the projector over a sequence of N projected patterns such that a unique $y^p$ value can be obtained by demodulating the captured camera pixels.

In PMP, the component patterns are defined by the set, $\{I_n^p : n=0, 1, \ldots, N-1\}$, according to:

$$I_n^p(x^p, y^p) = \frac{1}{2} + \frac{1}{2}\cos\left(2\pi\left(\frac{n}{N} - y^p\right)\right). \tag{1}$$

where $(\chi^p, y^p)$ is the column and row coordinate of a pixel in the projector, $I_n^p$ is the intensity of that pixel in a projector with dynamic range from 0 to 1, and n represents the phase-shift index Over the N total patterns.

For reconstruction, a camera captures each image where the sine wave pattern is distorted by the scanned surface topology, resulting in the patterned images expressed as:

$$I_n^c(x^c, y^c) = A^c + B^c \cos\left(\frac{2\pi n}{N} - \theta\right). \tag{2}$$

where $(\chi^c, y^c)$ is the coordinates of a pixel in the camera while $I_n^c(\chi^c, y^c)$ the intensity of that pixel. The term $A^c$ is the averaged pixel intensity across the pattern set that includes the ambient light component, which can be derived according to:

$$A^c = \frac{1}{N}\sum_{n=0}^{N-1} I_n^c(x^c, y^c). \tag{3}$$

Correspondingly, the term $B^c$ is the intensity modulation of a given pixel and is derived from $I_n^c(\chi^c, y^c)$ in terms of real and imaginary components where:

$$B_R^c = \sum_{n=0}^{N-1} I_n^c(x^c, y^c)\cos\left(\frac{2\pi n}{N}\right) \tag{4}$$

and $$B_I^c = \sum_{n=0}^{N-1} I_n^c(x^c, y^c)\sin\left(\frac{2\pi n}{N}\right) \tag{5}$$

such that $$B^c = \|B_R^c + jB_I^c\| = \{B_R^{c2} + B_I^{c2}\}^{\frac{1}{2}}; \tag{6}$$

which is the amplitude of the observed sinusoid.

If $I_n^c(\chi^c, y^c)$ is constant or less affected by the projected sinusoid patterns, $B^c$ will be close to zero. Thus $B^c$ is employed as a shadow noise detector/filter [6] such that the shadow-noised regions, with, small $B^c$ values; are discarded from further processing. Of the reliable pixels with sufficiently large $B^c$, $\theta$ represents the phase value of the captured sinusoid pattern derived as:

$$\theta = \angle(B_R^c + jB_I^c) = \arctan\left\{\frac{B_I^c}{B_R^c}\right\}, \tag{7}$$

which is used to derive the projector row according to $\theta=2\pi y^p$.

If we treat the samples of a subject camera pixel as a single period of a discrete-time signal, $\chi[n]$ for $n=1, 2, \ldots, N-1$, then we can define the Fourier terms, $X[k]$ for $k=1, 2, \ldots, N-1$, using a discrete-time Fourier transform. From $X[k]$, we then note that $A^c$ is related to the DC component according to:

$$A^c = \frac{1}{N}X[0] \tag{8}$$

while $B^c$ and $\theta$ are related to $X[1]=X^*[N-1]$ according to:

$$B^c = \frac{2}{N}\|X[1]\| = \frac{2}{N}\|X[N-1]\| \tag{9}$$

and $$\theta = \angle X[1] = -\angle X[N-1]. \tag{10}$$

Because, of these relationships, we refer to the frequency terms, $X[0]$, $X[1]$, and $X[N-1]$, as the principal frequency components, while the remaining terms are referred to as the non-principal terms and are the harmonics of $X[1]$.

Under ideal conditions, the non-principal frequency terms, $X[k]$ for $k=2, 3, \ldots, N-2$, are always equal to zero, but in the presence of sensor noise, the terms are, themselves, drawn from an additive, white-noise process. At the same time, if a target surface is moving toward or away from the camera sensor at a slow rate, then the frequency of the sinusoid represented in the time sequence, $\chi[n]$, is modulated to have a slightly higher or lower frequency, and as such, we expect the spectral components $X[2]$ and $X[N-2]$ to increase as the energy in $X[1]$ and $X[0]$ becomes less concentrated. Combining slow motion with additive noise, there exists some threshold, T, at which the magnitude of these non-principal frequency terms can be assumed to reside.

Given the lack of an information bearing signal on the harmonic frequencies, one might be tempted to use these non-principal frequency terms to carry additional phase information for the purpose, for example, of phase unwrapping. But doing so involves the reduction in amplitude of the component sinusoids in order to fit the assorted signals within the dynamic range of both the camera and projector: thereby, reducing the signal to noise ratio on these channels. Absent this use, if a pixel falls off the edge of a foreground object or if there is a dramatic change in surface texture, we expect to see a large magnitude term in the harmonics as the foreground phase term is essentially modulated by a step-edge while the background phase term is modulated by the inverse of this same step.

Step edges and impulses, having large high-frequency spectral components, introduce high-frequency energy in the captured PMP patterns. As such, if a particular non-principal frequency term were to have a magnitude larger than T, then we can assume that this pixel contains a discontinuity in phase. Hence, we can delete this pixel from further processing. Incorporating the above ideas into the real-time SLI system of Liu et al, we employ the first harmonic $D^c=2/N\|X[2]\|$ such that only those pixels with sufficiently large $B^c>T_B$ and sufficiently small $D^c>T_D$ are further processed to obtain phase. While there may be a small performance hit by adding a second LUT operation, a portion of that loss is offset by a reduction in the number of pixels that are further processed to obtain $\theta$.

To test performance and LUT-based processing, the Liu et al experimental set up (i.e., that used in connection with EXAMPLE 01, above) was modified using Microsoft® Visual Studio 2005 with managed C++. The imaging sensor used was an 8-bits per pixel, monochrome, Prosilica GC640M, gigabit Ethernet camera with a frame rate of 120 fps and 640×480 pixel resolution. The projector used was composed of a Texas Instrument's Discovery 1100 board with ALP-1 controller and LED-OM with 225 ANSI lumens. The projector has a resolution of 1024×768 and 8-bits per pixel grayscale. The camera and projector were synchronized by an external triggering circuit. As far as the processing unit, a Dell Optiplex 960 with an Intel Core 2 Duo Quad Q9650 processor running at 3.0 GHz was employed.

Using a calibration target of a white box with black circles and the SLI system described above, an image (i.e., snap shot shown in FIG. 1 (left) of ATTACHMENT A2, a manuscript authored by three of the applicants hereof as explained above) was captured from the SLI system's input camera of the calibration target, moving. The snap shot labeled FIG. 1 (right) of that same ATTACHMENT A2, shows the corresponding first harmonic's magnitude image using N=4 pattern, unit-frequency PMP where $T_B=10$ and $T_D=2$. The motion of the calibration target creates edge pixels along the boundaries of black circles on the white box calibration target as well as along the edges of the white box. Without edge detection, a resulting 3-D point cloud calculated and displayed using the technique explained elsewhere herein, shows a series of outlier points projecting from the camera's focal point and through the target object's edge points. Employing the unique edge detection technique contemplated herein—as visual inspection by comparing the captured images showed—the number of outliers was clearly reduced.

While certain representative embodiments and details have been shown for the purpose of illustrating features of the invention, those skilled in the art will readily appreciate that various modifications, whether specifically or expressly identified herein, may be made to these representative embodiments without departing from the novel core teachings or scope of this technical disclosure. Accordingly, all such modifications are intended to be included within the scope of the claims. Although the commonly employed preamble phrase "comprising the steps of" may be used herein, or hereafter, in a method claim, the applicants do not intend to invoke 35 U.S.C. §112 ¶6 in a manner that unduly limits rights to its claimed invention. Furthermore, in any claim that is filed herewith or hereafter, any means-plus-function clauses used, or later found to be present, are intended to cover at least all structure(s) described herein as performing the recited function and not only structural equivalents but also equivalent structures.

We claim:

1. A system for 3-D triangulation-based image acquisition of a surface-of-interest under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right)$$

where $I_n^p$ is an intensity of a pixel in a projector for an $n^{th}$ projected image in a particular moment in time; K represents a number of component sinusoids comprising the first and second superimposed sinusoids, where K is less than or equal to (N+1)/2, the multi-frequency pattern comprising at least N projected patterns; a parameter $B_k^p$ represents constants for determining at least one parameter of each of said component sinusoids; $A^p$ is a scalar; $f_k$ is a spatial frequency of a $k^{th}$ sinusoid corresponding with temporal frequency k; and $y^p$ represents a spatial coordinate in an image projected comprising the multi-frequency pattern.

2. A process for 3-D triangulation-based image acquisition of a surface-of-interest under observation by at least one camera, by projecting onto the surface-of-interest a multi-frequency pattern comprising a plurality of pixels representing at least a first and second superimposed sinusoid projected simultaneously, each of the sinusoids represented by the pixels having a unique temporal frequency and each of the pixels projected to satisfy $$I_n^p = A^p + \sum_{k=1}^{K} B_k^p \cos\left(2\pi f_k y^p + \frac{2\pi k n}{N}\right)$$

where $I_n^p$ is an intensity of a pixel in a projector for an $n^{th}$ projected image in a particular moment in time; K represents a number of component sinusoids comprising the first and second superimposed sinusoids, where K is less than or equal to (N+1)/2, the multi-frequency pattern comprising at least N projected patterns; a parameter $B_k^p$ represents constants for determining at least one parameter of each of said component sinusoids; $A^p$ is a scalar; $f_k$ is a spatial frequency of a $k_{th}$ sinusoid corresponding with temporal frequency k; and $y^p$ represents a spatial coordinate in an image projected comprising the multi-frequency pattern.

3. A non-transitory computer readable storage medium having stored thereon, executable program code and instructions for image acquisition of the surface-of-interest, comprising the steps of the process of claim 2.

4. The system of claim 1 wherein:
$I_n^p$ represents a value between 0 and 255;
the step of projecting onto the surface-of-interest is carried out by an 8-bit color depth projector;
K=2;
the first superimposed sinusoid is characterized such that k=1 and $f_1$=1;
the second superimposed sinusoid is characterized such that k=2 and $f_2$ is greater than 1; and
N represents a value greater than or equal to 5.

5. The system of claim 1 wherein the camera captures camera image data comprising pixel intensity, $I_n^c$, for each of an $n^{th}$ projected image onto the surface-of-interest, determined according to an expression $$I_n^c = A^c + \sum_{k=1}^{K} B_k^c \cos\left(2\pi f_k y^p + \frac{2\pi k n}{N}\right) + \eta$$

where $\eta$ represents a value for noise due to an amount of error introduced by a light sensor of the camera; a parameter $B_k^c$ represents constants relating to said camera image data so captured; and $A^p$ is a scalar.

6. The system of claim 5 wherein a phase term is extracted from said camera image data by carrying-out, for each k, the expression $$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right)$$

and further comprising a processor unit adapted for carrying-out a lookup table (LUT)-based processing of the camera image data.

7. The process of claim 2 further comprising the step of capturing camera image data comprising pixel intensity, $I_n^c$, for each of an $n^{th}$ projected image onto the surface-of-interest, determined according to an expression:

$$I_n^c = A^c + \sum_{k=1}^{K} B_k^c \cos\left(2\pi f_k y^p + \frac{2\pi k n}{N}\right) + \eta$$

where $\eta$ represents a value for noise due to an amount of error introduced by a light sensor of the camera; a parameter $B_k^c$ represents constants relating to said camera image data so captured; and $A^p$ is a scalar.

8. The process of claim 7 further comprising the steps of:
extracting a phase term from said camera image data by carrying-out, for each k, the expression $$2\pi f_k y^p = \arctan\left(\frac{\sum_{n=0}^{N-1} I_n^c \times \cos\left(\frac{2\pi k n}{N}\right)}{\sum_{n=0}^{N-1} I_n^c \times \sin\left(\frac{2\pi k n}{N}\right)}\right); \text{ and}$$

carrying-out a lookup table (LUT)-based processing of the camera image data.

9. The process of claim 8 wherein said step of carrying-out a lookup table (LUT)-based processing, comprises the steps of: querying a modulation lookup table (MLUT) to obtain the texture map for the surface-of-interest under observation, and querying a phase lookup table (PLUT) to obtain a plurality of corresponding phase values for the camera image data.

10. A non-transitory computer readable storage medium having stored thereon, executable program code and instructions for image acquisition of the surface-of-interest, comprising the steps of the process of claim 7.

11. A non-transitory computer readable storage medium having stored thereon, executable program code and instructions for image acquisition of the surface-of-interest, comprising the steps of the process of claim 8.

12. A non-transitory computer readable storage medium having stored thereon, executable program code and instructions for image acquisition of the surface-of-interest, comprising the steps of the process of claim 9.

* * * * *